(12) United States Patent
Wong et al.

(10) Patent No.: US 10,609,620 B1
(45) Date of Patent: Mar. 31, 2020

(54) MULTI-HOP POWER MANAGEMENT IN A WIRELESS MESH NETWORK

(71) Applicant: Amazon Technologies, Inc., Seattle, WA (US)

(72) Inventors: Chiu Ngok Eric Wong, San Jose, CA (US); Jungtao Liu, Saratoga, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 130 days.

(21) Appl. No.: 15/864,943

(22) Filed: Jan. 8, 2018

(51) Int. Cl.
*H04W 40/08* (2009.01)
*H04L 12/733* (2013.01)
*H04W 84/18* (2009.01)

(52) U.S. Cl.
CPC ........... *H04W 40/08* (2013.01); *H04L 45/122* (2013.01); *H04W 84/18* (2013.01)

(58) Field of Classification Search
CPC ..... H04W 40/08; H04W 84/18; H04W 40/02; H04W 84/16; H04L 45/122; H04L 45/12
See application file for complete search history.

(56) References Cited

U.S. PATENT DOCUMENTS

| | | | | |
|---|---|---|---|---|
| 8,554,200 B2* | 10/2013 | Ribeiro | ............... | H04W 72/082 455/422.1 |
| 9,143,957 B2* | 9/2015 | Sadek | ................... | H04W 16/14 |
| 2007/0225029 A1* | 9/2007 | Abusch-Magder | ... | H04W 24/02 455/525 |
| 2009/0047916 A1* | 2/2009 | Haykin | ................. | H04L 5/0037 455/115.1 |
| 2010/0027517 A1* | 2/2010 | Bonta | ..................... | H04L 45/22 370/338 |
| 2013/0265898 A1* | 10/2013 | Shin | .................... | H04W 72/082 370/252 |
| 2015/0029954 A1* | 1/2015 | Victor | ................. | H04L 12/5692 370/329 |
| 2015/0245358 A1* | 8/2015 | Schmidt | .............. | H04L 43/0888 370/329 |
| 2016/0226575 A1* | 8/2016 | Subramani | ........ | H04W 72/1226 |
| 2018/0343588 A1* | 11/2018 | Sadek | ................. | H04W 52/241 |
| 2019/0090200 A1* | 3/2019 | Alpert | ................. | H04W 52/146 |
| 2019/0342918 A1* | 11/2019 | Bhargava | .............. | H04W 40/12 |

* cited by examiner

*Primary Examiner* — Hoang-Chuong Q Vu
(74) *Attorney, Agent, or Firm* — Lowenstein Sandler LLP

(57) ABSTRACT

Technology for multi-hop power management is described. In one embodiment, processing logic obtains a noise floor value, an interference threshold parameter, a data rate threshold parameter, and a set of channel interference metrics from each of a first mesh network device, a second mesh network device, and a third mesh network device, respectively. The processing logic identifies a network path that traverses the three mesh network devices. The processing logic calculates a first transmit power level for the first mesh network device, a second transmit power level for the second mesh network device, and a third transmit power level for the third mesh network device. Data transmissions by each of the mesh network device at the respective transmit power levels ensure a minimum data transmission rate over each hop of the network path.

20 Claims, 13 Drawing Sheets

| Network ID 520 | $G_{i,j}$ 530 | $N_i$ 540 | $T_i$ 550 | $S_i$ 560 | $P_i$ 570 | [other information] |
|---|---|---|---|---|---|---|
| SSID1 | $[G_{1,j}, ... G_{1,n}]$ | -120 dBm | -100 dBm | 30Mbps (target 20Mbps) | $0.8\ P_{max}$ | |
| SSID2 | $[G_{2,j}, ... G_{2,n}]$ | -80 dBm | -90 dBm | 20Mbps | $0.7\ P_{max}$ | |
| SSID3 | $[G_{3,j}, ... G_{3,n}]$ | -80 dBm | -90 dBm | 20Mbps | $0.8\ P_{max}$ | |
| SSIDN | $[G_{n,j}, ... G_{n,n}]$ | -100 dBm | -90 dBm | 25Mbps (target 20Mbps) | $0.9\ P_{max}$ | |

Aggregate report 500

FIG. 5

MULTI-HOP POWER MANAGEMENT IN A WIRELESS MESH NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 5 schematically illustrates an example aggregate report generated by the multi-hop power manager operating in accordance with embodiments of the present disclosure.

DETAILED DESCRIPTION

Figure 1:
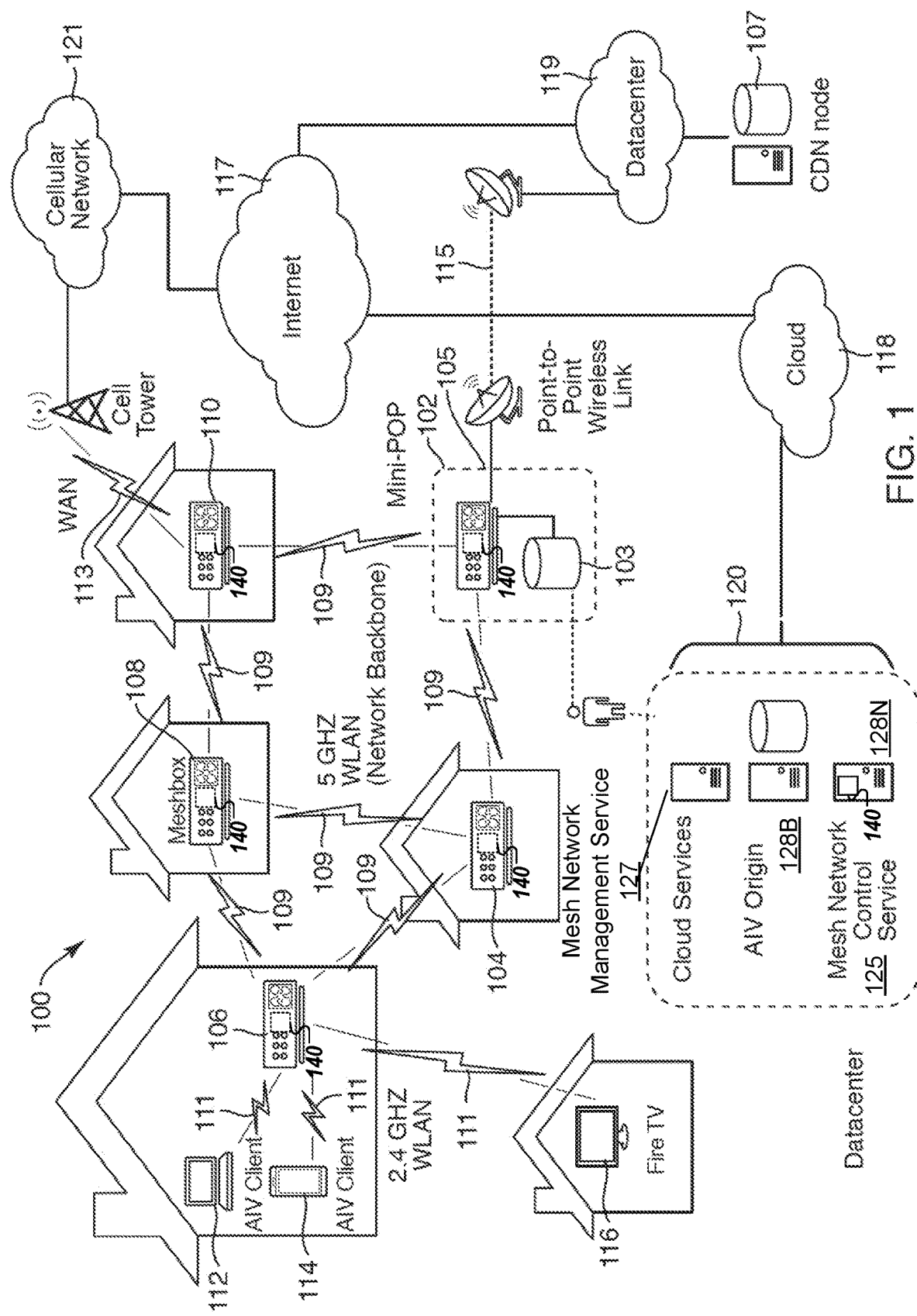
FIG. 1 is a network diagram of network hardware devices organized in a wireless mesh network (WMN) for content distribution to client devices in an environment of limited connectivity to broadband Internet infrastructure according to one embodiment.

Technology for transmit power and rate adaption for wireless mesh networks is described. Nodes of a mesh network may establish peer-to-peer wireless links for transmitting messages to each other. In particular, messages may be transferred, through other nodes, between the source and destination nodes that are not in direct communication with each other. In an illustrative example, a mesh network may be employed for digital content distribution to client network devices in an environment of limited connectivity to broadband Internet infrastructure. The digital content may include video and/or audio files. "Digital content item" herein refers to at least a part of a digital content file.

Described herein is a wireless mesh network (WMN) containing multiple mesh network devices, organized in a mesh topology. A WMN is made up of a set of radio links between network devices that forms a communications network to provide wireless connectivity between them. Traffic originating from one device (called a source node) could traverse over several hops before arriving at its intended destination (called a destination node). A "hop" as used herein may refer to a portion of a network path between two neighboring nodes. The radio links between devices could adopt the same wireless technology (e.g. wireless local area network (WLAN) technologies such as Wi-Fi®, personal area network (PAN) technologies, such as Bluetooth® and ZigBee®, or the like). Alternatively, the radio links can operate using over the same wireless spectrum.

Since devices communicate wirelessly to one another, their data transmissions contribute to the interferences observed at other neighboring devices within its radio coverage. This, in turn, affects the received signal-to-interference-plus-noise ratio (SINR) for other concurrent data transmissions. Fluctuations in interference can cause inefficiencies (i.e. packet failures, data transmission rate shifting, and so on) and instability in the overall network throughput.

Network throughput is defined as a total number of bits per second per Hertz per unit area. Stability is a measure of the fluctuation of network throughput and is a direct function of the transmit power levels and data transmission rates from devices operating concurrently. Network throughput stability is particularly important in data transmissions over a multi-hop path between network devices in the wireless mesh network because network throughput stability ensures a consistent or uniform data transmission rate for each hop, avoiding traffic queue buildup (i.e. buffer overflow) on intermediate devices in the multi-hop path. The embodiments described herein are directed to a multi-hop power manager that calculates transmit power levels for mesh network devices in a WMN to ensure a uniform network throughput stability through a network path. The uniform network throughput stability can be achieved by ensuring at least a specified minimum data transmission rate of data transmissions over each hope of the network path (e.g., each link needs at least 25 Mbps). In one embodiment, the multi-hop power manager calculates the transmit power levels that results in a uniform data transmission rate of data transmissions over a network path.

The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. The multiple network hardware devices 102-110 each include a multi-hop power manager 140 as described in more detail below with respect to FIGS. 3A-7. The multi-hop power manager 140 can be used in a distributed configuration where each of the network hardware devices 102 include the multi-hop power manager 140 to compute the transmit power levels. Alternatively, the multi-hop power manager 140 can be deployed in a centralized configuration in which the transmit power manager 140 is deployed as a centralized controller, such as in the mesh network control service 125. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP), or both. The CDN device 107 may be a POP device (also referred to as a POP device), an edge server, a content server device, or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage and/or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100. In such cases, the content in the attached storage can be manually refreshed from time to time.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include a mesh network control service 125 and a mesh network management service 127. The services 120 may also include cloud services to control setup and manager the mesh nodes, a content delivery service (e.g., AIV origin), as well as other cloud services. The mesh network control service 125 can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss. It should be noted that the mini-POP has a network connection that need not be an Internet connection to handle cache misses. These requests are forwarded to the CDNs. Alternatively, some mini-POP devices may not have network connections and do not handle cache misses as described herein.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. It should be noted that the minimum requirement for 720 HD is 1.9 Mbps and a maximum is 3.5 Mbps. For some services to provide HD content, the 3.5 Mbps can be considered the minimum requirement. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
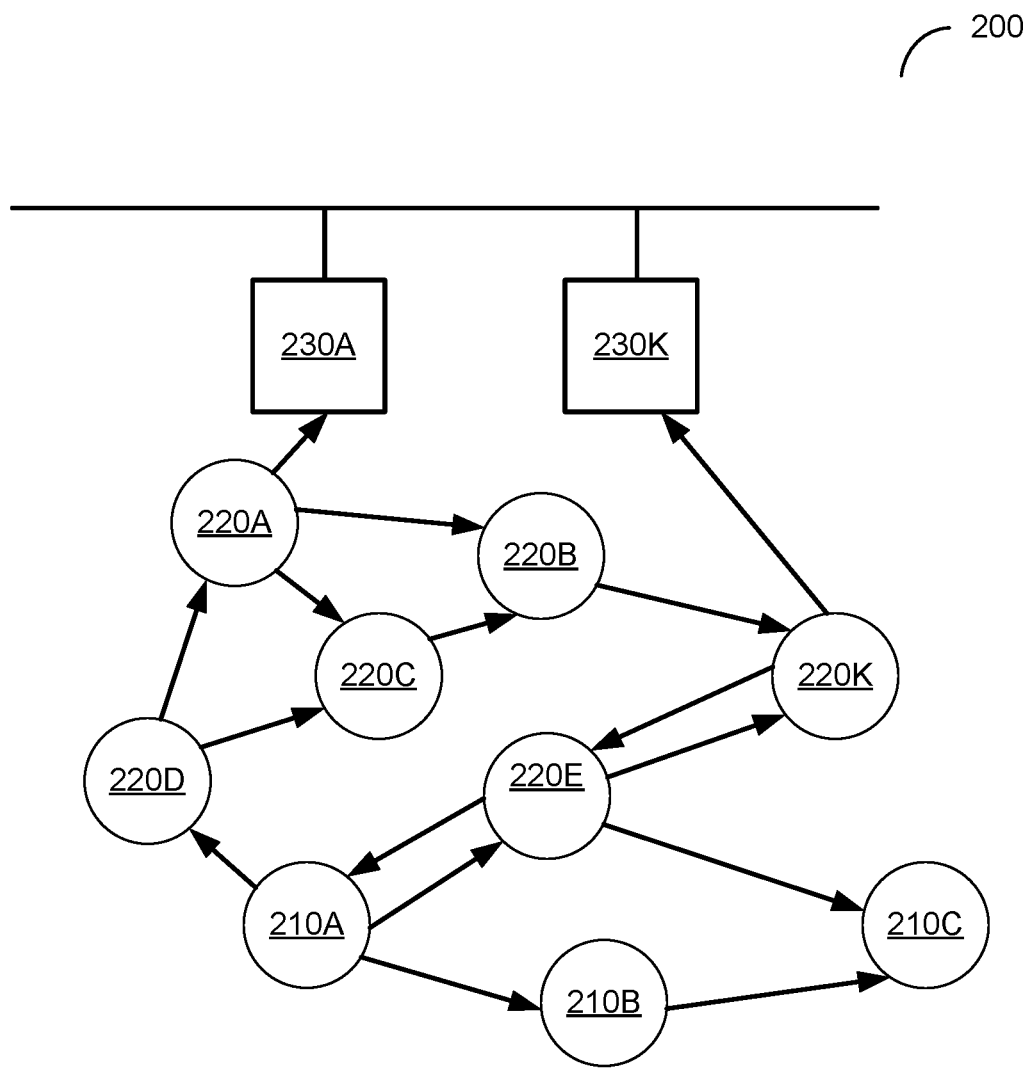
FIG. 2 is a functional network diagram of an illustrative example of a wireless mesh network operating in accordance with embodiments of the present disclosure.

FIG. 2 is a functional network diagram of an illustrative example of a wireless mesh network operating in accordance with embodiments of the present disclosure. In one embodiment, each of the network devices of wireless mesh network 100 of FIG. 1 may implement functions of one or more functional components of FIG. 2. In other embodiments, various other wireless mesh networks may include hardware and/or software components which may implement functions of one or more functional components of FIG. 2.

As schematically illustrated by FIG. 2, an example wireless mesh network 200 may include a plurality of mesh network nodes including communication devices that implement the functions of wireless mesh point stations (MP STA) 210A-210Z, mesh access points (MAP) 220A-220K, and mesh portals (MPP) 230A-220M. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

As noted herein above, network devices may establish peer-to-peer wireless links and transmit messages to each other. In particular, messages may be transferred, through other nodes, between two nodes that are not in direct communication with each other. Thus, a network device may be a source, a destination, or an intermediate node on a mesh path (also referred to herein as a network path).

Upon booting up, a network device may discover and join a wireless mesh network operating in accordance the embodiments of the present disclosure (e.g., wireless mesh network 100 of FIG. 1). Discovering available wireless mesh networks may be performed by passive or active scanning. In the passive scanning mode, the network device records the information from any beacon frames that have been received on one or more radio channels. Beacon frames are periodically transmitted by wireless access points in order to allow network devices to detect and identify the wireless mesh network, as well as match communication parameters for determining whether to join the wireless mesh network. In the active scanning mode, the network device may transmit, on each of one or more radio channels supported by the network device, probe request frames in order to solicit responses from available networks. An access point receiving a probe request may generate a probe response advertising the network parameters.

Figure 3A:
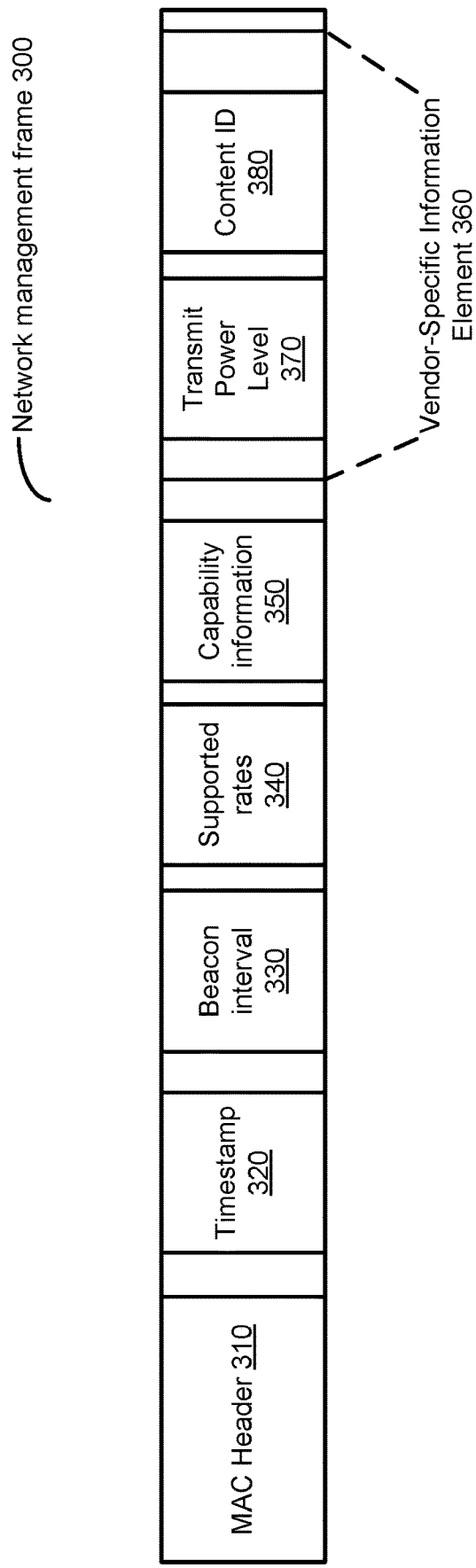
FIG. 3A schematically illustrates an example structure of a management frame transmitted by an access point operating in accordance with embodiments of the present disclosure.

Management frames, including beacon frames and probe responses, that are transmitted by wireless access points may advertise various network parameters, including physical layer (PHY) parameters and various other parameters. FIG. 3A schematically illustrates an example structure of a management frame transmitted by an access point operating in accordance with embodiments of the present disclosure. As shown in FIG. 3A, the management frame 300, which may be represented by a beacon frame, an acknowledgment (ACK) frame, or a probe response frame, may include the Media Access Control (MAC) header 310 comprising the source and destination MAC addresses and various other fields. The management frame 300 may further include the timestamp 320 and the beacon interval 330. The management frame 300 may further include the supported rates 340 identifying one or more data transmission rates supported by the network. The management frame 300 may further include the capability information 350 identifying various physical layer parameters supported by the network. The management frame 300 may further include various other network parameters which are omitted from FIG. 3 for clarity and conciseness. For example, the management frame 300 may include a network device identifier and one or more physical layer parameters. Data frames may also include some similar fields, such as the MAC header 310, network device identifiers, physical layer parameters 640, and a transmit power level used by the transmitting device. It should be noted that the transmit power level could be included in the capability information 350, the physical layer parameters, or the like.

The management frame 300 may further include one or more vendor-specific information elements 360. In one embodiment, the vendor-specific information elements 360 may include the value 370 of the transmit power level used to transmit the management frame 300 network resource utilization metric that reflects certain parameters of data frame transmission along a network path from the access point transmitting the management frame 300 to a network ingress device which connects the mesh network by one or more wireless and/or wireline connections to a backbone network in communication with one or more CDN nodes. The access point may utilize a path selection method to determine a network path to the ingress device, as described in more detail herein below, and may then calculate the value of the network resource utilization metric associated with the determined path.

Referring again to FIG. 3A, in one embodiment, the access point may further advertise one or more digital content categories and/or digital content items that may be accessed by network devices via the access point. Accordingly, the vendor-specific information elements 360 of the management frame 300 may include a content identifier field including identifiers of one or more digital content categories and/or digital content items. The identifiers of digital content categories and/or items may be represented, e.g., by bit strings which represent index values identifying entries of a digital content catalog which associates each bit string with an alphanumeric string identifying the corresponding content category and/or content item.

As described above, network throughput stability is particularly important in data transmissions over a multi-hop path between network devices in the wireless mesh network because network throughput stability ensures a consistent or uniform data transmission rate for each hop. Uniform data transmission rates over the multi-hop path can avoid traffic queue buildup (i.e. buffer overflow) on intermediate devices in the multi-hop path. The embodiments described herein are directed to a multi-hop power manager 140 that calculates transmit power levels for mesh network devices in a WMN to ensure a uniform network throughput stability through a network path. The details of the power calculations are set forth below.

According to Shannon's limit, the link capacity C in bps of an added white Gaussian noise (AWGN) channel is bounded by bandwidth and SINR as expressed in the following equation (1):

$$C = W \log 2(1+\text{SINR}), \quad (1)$$

where W is bandwidth in Hz and SINR can be expressed as equation (2):

$$SINR = \frac{Pi * Gi,j}{(I+N)}, \quad (2)$$

where Pi is transmit power of device i, and Gi,j is path loss between devices i and j. Path loss is the reduction in power density (attenuation) of electromagnetic energy radiated between a transmitter and a receiver. The path loss can be considered an amount of power loss (attenuation) between a transmit power level of a signal transmitted at a transmitter and the resulting received power level of the signal received at a receiver. The path loss is just one way to represent an interference level of the communication channel. The interference level is the amount of interference affecting transmissions on the particular communication channel. The product of Pi Gi,j denotes the total received power (i.e. desired signals) at the intended destination at device j.

Interference I is the aggregate received power from all concurrent transmissions, as expressed in the following equation (3):

$$I = \Sigma k \neq i, j P k G k j, \quad (3)$$

where P is transmit power of device j, and Gk,j is path loss between devices k and j. Noise N is assumed to be AWGN. In this description, the transmissions are half-duplex.

For network throughput stability, the multi-hop power manager 140 uses an interference threshold parameter (Tj) which represents a total amount of interference plus noise observed at device j, as set forth in following equation (4):

$$I = \Sigma k \neq i, j P k G k j, + N j \leq T j \quad (4)$$

Equation (4) can be represented in matrix form in the following equation (5):

$$G*P + N \leq T, \quad (5)$$

where Gi,j is a matrix of path losses between device i and device j. The transmit power P can be expressed as follows in equation (6):

$$P = (P_1, \ldots, P_m)^T \quad (6)$$

where $P_i$ is transmit power of device i. The noise N can be expressed as follows in equation (7):

$$N = (N_1, \ldots, N_n)^T, \quad (7)$$

where $N_i$ is noise observed at device i. The interference T can be expressed as follows in equation (8):

$$T = (T_1, \ldots, T_m)^T, \quad (8)$$

where $T_i$ the interference threshold for device i. This framework is also extensible to more sophisticated channel models in other embodiments.

In one embodiment, the path loss is one type of data rate threshold parameter. The data rate threshold parameter can be expressed as a value or a set of values. Alternatively, the data rate threshold parameter can be expressed as a function of a data transmission rate, such as the MSC rate. Alternatively, other data rate threshold parameters can be used. In one embodiment, the path loss can be represented as a function using Euclidian distance as set forth in the following equation (9):

$$Gi,j = \begin{cases} \frac{1}{d(i,j)^\alpha}, & \text{if } i \neq j \\ 0, & \text{if } i = j \end{cases} \quad (9)$$

In other embodiments, the data rate threshold parameter, such as the path loss, can be expressed as a distribution function, such as a distribution function of SINR. For example, SINR can be defined as a function as expressed in equation (16):

$$F_X(x) = P(X \leq x). \quad (10)$$

where the random variable X, which represents the distribution function of X, evaluated at x, is the probability that X will take a value less than or equal to x. This equation is the cumulative distribution function (CDF) that can be used to specify the distribution of multivariate random variables. In other embodiments, other distribution functions can be used to define the data rate threshold parameter. For example, in another embodiment, the data rate threshold parameter can be expressed as a distribution function of a frequency distribution model, such as a probability density function (PDF). A frequency distribution model can be a table that includes the frequency of various outcomes in a sample and each entry contains the frequency or count of the occurrences of values with a particular group or interval. Alternatively, other communication channel models can be used to characterize the data rate of the communication channel. In other embodiments, the data rate threshold parameter can be a value or a range of values.

Referring back to equation (5), knowing G, N, and T, P can be solved as expressed by rearranging equation (5) as shown in equation (11) below:

$$P \leq G^{-1} * (T-N). \quad (11)$$

Equation (11) provides a maximal transmit power vector P for the all devices in the wireless mesh. It should be noted that transmit power is also bounded by regulatory domain that the device operates in. It should also be noted that a larger T allows for a larger transmit power vector P. A common value for all entries of T denotes a uniform interference target. As described herein, by having a uniform interference target, the multi-hop power manager 140 can ensure network throughput stability through the network path. The uniform interference target can also ensure a uniform data transmission rate of data transmissions over the network path For a packet transmission to be successful, this is dependent on the received SINR, e.g., from device i to device j as expressed in equation (12):

$$\frac{P_i G_{i,j}}{I_j + N_j} \geq S_i, \quad (12)$$

where $S_i$ is the minimal received SINR for a particular modulation and coding scheme (MCS) index. To calculate the minimal transmit power to meet a desired link capacity in the wireless mesh, equation (12) can be rearranged as in equation (13):

$$P \geq (\beta * I - G)^{-1} * N, \quad (13)$$

where β is represented as follows in equation (14):

$$\beta = (\beta_1, \ldots, \beta_m)^T, \quad (14)$$

or as follows in equation (15):

$$\beta_1 = \frac{G_{i,j}^T}{S_i}. \quad (15)$$

Equation (13) provides a way to calculate the minimal transmit power to meet a desired link capacity in the wireless mesh. It should be noted that a larger S results in a higher MCS rate, but this means a larger transmit power P is required for the packet transmission to be successful.

Equations (11) and (13) bound the transmit power vector P to support a minimal data rate on each link, taking into account the number of concurrent transmissions in the wireless mesh, distances separating them, and noise floor.

The multi-hop power manager 140 can be used to determine the interference matrix G, which denotes the interference each device has on one another during packet transmissions. In one embodiment, the entries for the interference matrix G can be found in the following methods. In one method, each device takes a turn to send 'training' frames with a fix transmit power (e.g. maximum value) and other devices measures the level of interference observed. The training frame can include information that represents the transmit power level value used. In one case, each device measures receive signal strength indicator (RSSI) of a beacon frame or any vendor specific management frames of other neighboring devices. The device can use reciprocity to determine path loss for the reverse link. For example, the devices can indicate the transmit power used in the beacon frame.

In one embodiment, each device sends values of these matrix entries to a central function, such as a dedicator controller; which in turn, are propagated to all other devices. The central function could also calculate the transmit power vector and send the power vector to all devices. In one embodiment, the central function is implemented in the mesh network control service 125 described above with respect to FIG. 1.

In another embodiment, entries for the interference matrix G can also be determined in a distributed manner. For example, the intended receiver estimates the sum of Ij+Nj observed and then sends these estimates back to the transmitter. In the distributed approach, the exchanging of information may avoid the need for a central entity.

The multi-hop power manager 140 can maintain a data rate of transmissions over multiple hops in a network path. The multiple-hop packet transmission is a trait of wireless mesh networks. To avoid traffic overflow or congestion along the multi-hop route, the multi-hop power manager 140 calculates a transmit power vector. The transmit power vector indicates values needed to support each link in the network path. For example, the Multiple-hop packet transmission is trait of wireless mesh. To avoid traffic overflow, or congestion along the multiple-hop route. The entity that calculates the transmit power vector can indicate values needed to support each link. The stability over the network path can be measured in terms of data rate (i.e., S) or in terms of interference (i.e., T). For example, the minimal received SINR values can be expressed as follows in equation (16):

$$S_1 = ( \ldots S_i (30 \text{ Mbps}), S_{i+1} (20 \text{ Mbps}), S_{i+2} (20 \text{ Mbps}), \ldots ). \quad (16)$$

Similarly, this also applies for the interference values T for each of the links in the network path.

In sum, the embodiments of the multi-hop power manager 140 provide a framework and method to jointly adapt transmit power and data rate to maximize network throughput. The embodiments of the multi-hop power manager 140 provide a method to calculate the allowable range of transmit power such that a minimal date rate can be supported while maintaining the desired stability. The embodiments of the multi-hop power manager 140 provide a method to calculate the transmit power vector needed to ensure that the network throughput stability can be maintain over multiple hops in a network path. As noted above, the stability can be measured in terms of data rate (i.e., S) or interference (i.e., T). It should be noted that the multi-hop power manager 140 can apply to radio devices with multiple radios and directional antennas, as described herein, as well to radio devices with omnidirectional antennas.

Figure 3B:
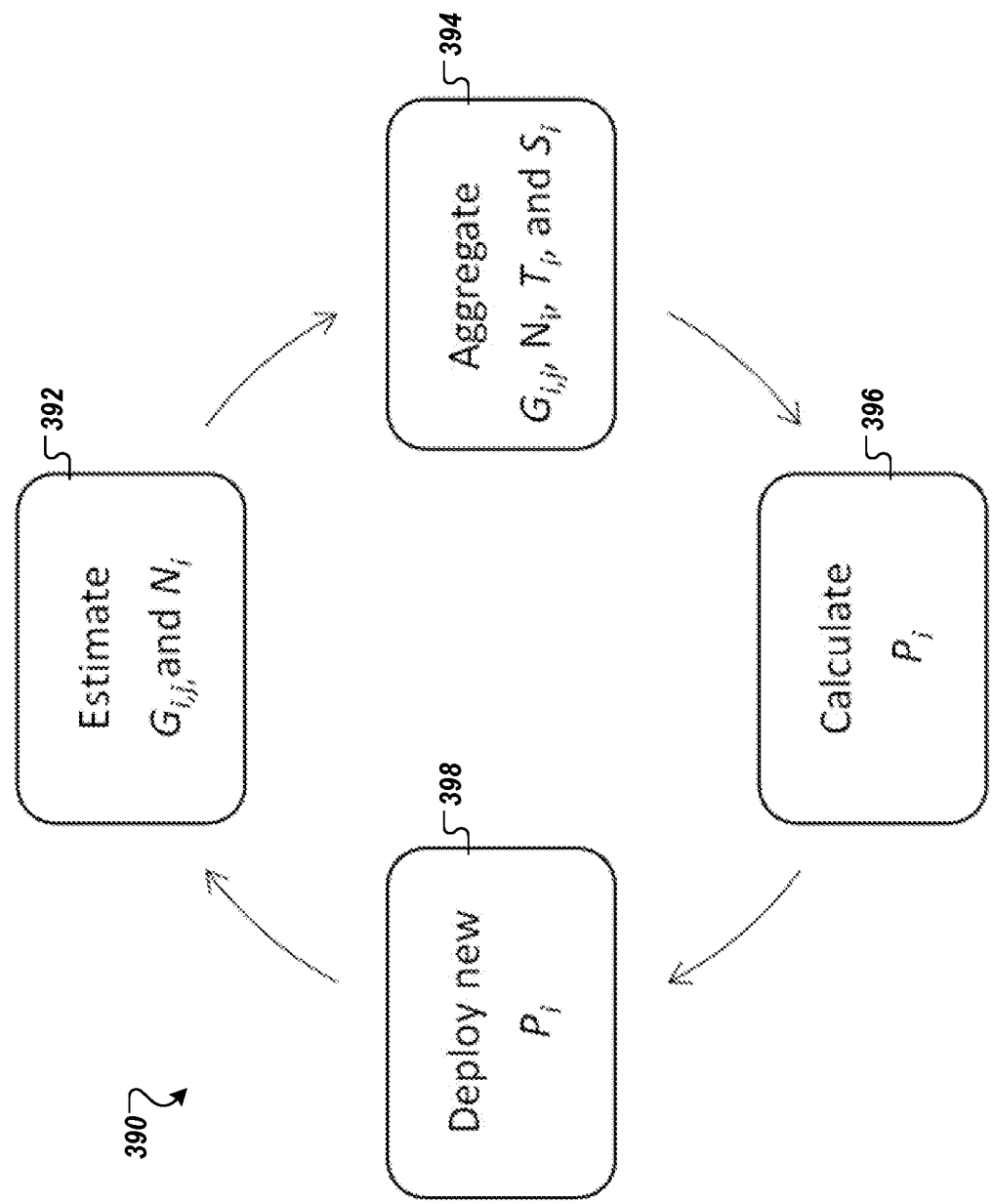
FIG. 3B is a flow diagram of one embodiment of a method of multi-hop power management by a multi-hop power manager, in accordance with embodiments of the present disclosure.

FIG. 3B is a flow diagram of one embodiment of a method 390 of multi-hop power management by a multi-hop power manager 140, in accordance with embodiments of the present disclosure. The method 390 may be performed by processing logic that includes hardware (e.g., circuitry, dedicated logic, programmable logic, microcode, etc.), software (e.g., instructions run on a processor to perform hardware simulation), or a combination thereof. In one embodiment, the method 390 may be performed by the mesh network control service 125 of FIG. 1 in a centralized configuration. In another embodiment, the method 390 may be performed by one or more of the mesh network devices of FIG. 1 in a distributed configuration.

Referring to FIG. 3B, at block 392, the processing logic implementing the method 390 may begin by estimating interference ($G_{i,j}$) and a noise floor ($N_i$) for each of the mesh network devices in a wireless mesh network. On each device i, device i measures the noise floor $N_i$ during known or pre-determined periods of no-activity in the wireless mesh network. Noise samples can be filtered and averaged to derive a resulting noise floor estimate for the device i. On each device i, device i measures the interference $G_{j,i}$ from neighboring device j. In one embodiment, in order to isolate the interference from device j, the device i can correlate RSSI with a transmitter MAC address in the frame transmitted from device j. This assumes the transmit power level of device j is known a priori. In another embodiment, information that represents the transmit power level is sent in an information element (IE) within a management frame, such as beacon frames, probe frames, responses, or the like. In one embodiment, in order to isolate the interference from device j, a central entity, such as the mesh network control service 125 schedules transmissions in a time division multiple access (TDMA) manner. In other words, a central entity schedules transmissions in the network one at a time, allowing all receiving devices to measure the interference due to device j. This may allow the device to measure the interference below the packet detection capacity of the receiver. That is the receiving device need not be able to detect and decode the transmitter MAC address. It should be noted that the operations of block 392 can be done in a centralized manner using the mesh network control service 125 or in a distributed manner. In some embodiments, new estimates for the interference ($G_{i,j}$) and the noise floor ($N_i$) for each of the mesh network devices can be done periodically or triggered by changes in network topologies and traffic patterns.

At block 394, the processing logic implementing the method 390 can aggregate interference ($G_{i,j}$) and the noise floor ($N_i$) for each of the mesh network devices, as well as a data rate threshold parameter (e.g., $S_i$) and an interference threshold parameter ($T_i$) from each of the mesh network devices. In one embodiment, once the measured interference ($G_{i,j}$) and the noise floor ($N_i$) are obtained, values from each device are sent and aggregated to a central entity, like the mesh network control service 125, along with data rate threshold parameters (e.g., $S_i$) and interference threshold parameters ($T_i$). In another embodiment, this central entity can be a separate device residing within the wireless network or a function performed by one of the devices. The central entity can also reside in the cloud. In another embodiment, this information can also be disseminated to all the devices in the wireless mesh network. This can be achieved either by a broadcast to neighboring devices or by sending a unicast to every other neighboring device individually. That way, every device has a copy of the aggregated information, unlike the centralized approach, where the aggregated information is only located on one device or entity.

At block 396, the processing logic implementing the method 390 can calculate the transmit power levels for the mesh network device in the wireless mesh network. The calculated transmit power levels can be values that result in a uniform data transmission rate of data transmissions over a network path of multiple hops. In one embodiment with the centralized approach, the set of transmit power levels subjected to the interference and SINR constraints is calculated at the central entity. In another with the distributed approach, the set of transmit power levels is calculated by every mesh network device. The mesh network device then selects the corresponding transmit power level.

At block 398, the processing logic implementing the method 390 can deploy information that represents the set of transmit power levels to the mesh network device in the wireless mesh network. In one embodiment with the centralized approach, information that represents the set of transmit power levels can be broadcasted to all devices in the network. In another embodiment, information that represents the set of transmit power levels can be unicast to each device individually. It should be noted that in embodiments with the distributed approach, these operations at block 398 are not needed, since each mesh network device calculates the set of transmit power levels.

Figure 4:
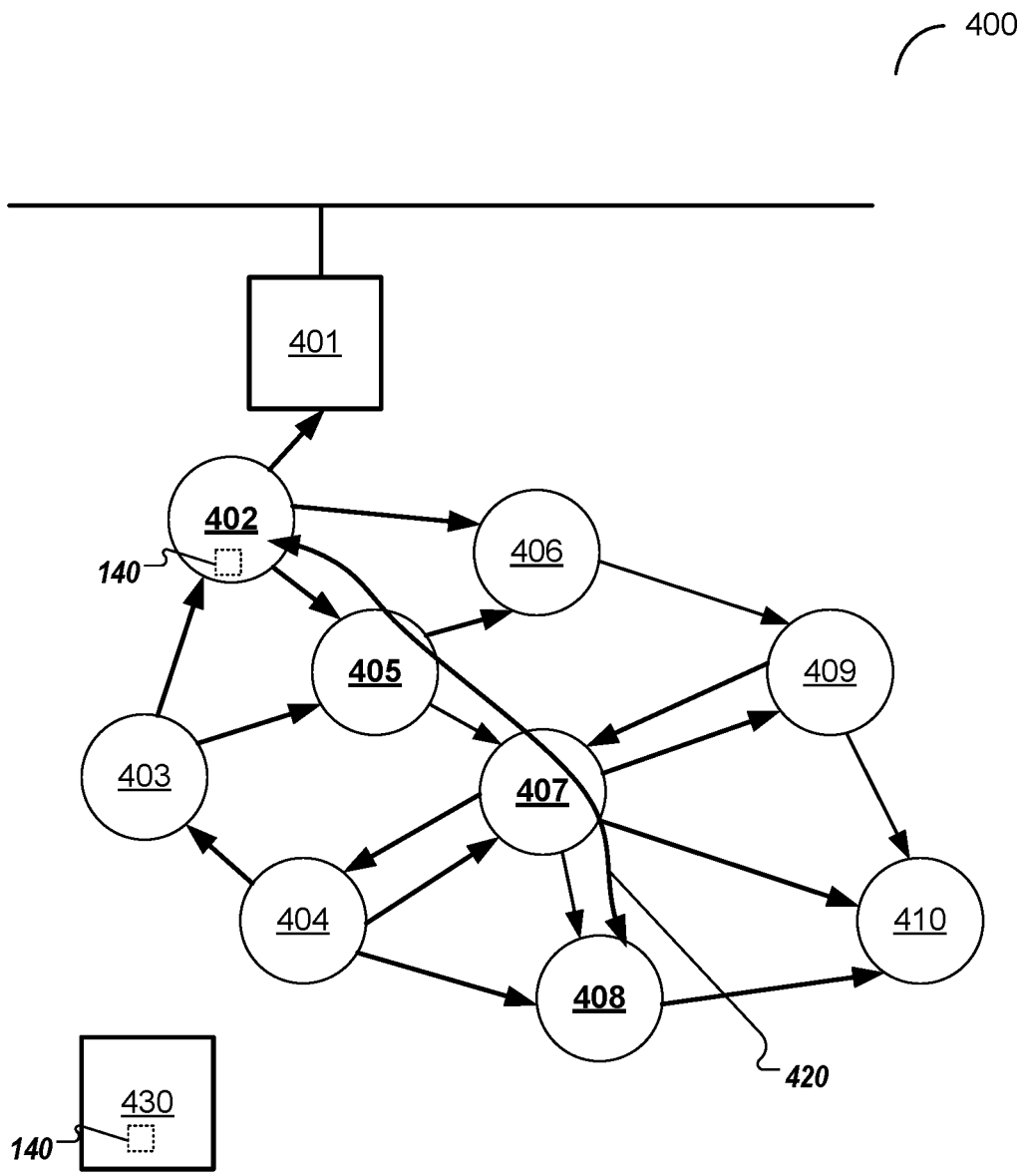
FIG. 4 schematically illustrates one embodiment of a path selection method implemented by a wireless mesh network operating in accordance with embodiments of the present disclosure.

FIG. 4 schematically illustrates one embodiment of a path selection method implemented by a wireless mesh network operating in accordance with embodiments of the present disclosure. As shown in FIG. 4, the wireless mesh network 400 may include nodes 401-410. The source node 402 may employ the dynamic path selection mode to find a network path 420 to the destination node 408. In an illustrative example, the source node may broadcast a network management frame including a route request (RREQ) information element identifying the destination node (e.g., using the MAC address of the destination node 408) and initializing the metric field to zero. Responsive to receiving a RREQ, an intermediate node (e.g., a node 405 or 407) may increment the metric field of the RREQ to reflect the airtime of the last hop leading to this node. The intermediate node may then create a route to the source node 402 or update an existing route to the source node, and re-broadcast the RREQ by forwarding it to its neighboring nodes. Thus, whenever an intermediate node forwards a RREQ, the metric field in the RREQ will be updated to reflect the cumulative metric of the route to the source of the RREQ. Responsive to receiving a RREQ, the destination node 408 may increment the metric field of the RREQ to reflect the airtime of the last hop leading to the destination node. The destination node may then select, among a plurality of candidate network paths between the source node 402 and the destination node 408, the network path having a minimal value of the network path selection metric.

Responsive to receiving a network management frame including the RREP information element identifying the destination, an intermediate node (e.g., a node 405 or 407) may create or update a route to the destination node 408 and forward the RREP towards the source node 402. Upon receiving the RREP, the source node 402 may create a route to the destination node 408. Upon receiving further RREQs identifying the same source node with a metric value better than the existing route, the destination node may update its route to the source node and send a new RREP to the source node along the updated route. Participating network nodes may store the created and/or updated routes in their respective routing tables.

As noted herein above, mesh network devices, also referred to herein as "network nodes," may establish peer-to-peer wireless links and transmit messages to each other. In particular, messages may be transferred, through other nodes, between two nodes that are not in direct communication with each other. In an illustrative example, a wireless mesh network may be employed for digital content distribution to client network devices in an environment of limited connectivity to broadband Internet infrastructure.

In order to improve network throughput stability over the links of the network path 420, the multi-hop power manager 140 can calculate a set of transmit power levels to ensure network throughput stability over the links of the network path 420. As described herein, the multi-hop power manager 140 can be implemented in a distributed matter with each of the mesh network device including the multi-hop power manager 140, such as illustrated at source node 402 (not illustrated at the other nodes). The multi-hop power manager 140 can generate an aggregate report that lists the mesh network device and their respective measurements and threshold parameters to calculate the transmit power levels for the mesh network devices. Alternatively, the multi-hop power manager 140 can be implemented in a centralized manner with a central entity 430. The central entity 430 can be a network device in the wireless mesh network or can be a service in the cloud, such as in the mesh network control service 125 of FIG. 1. In one embodiment, the multi-hop power manager 140 performs the operations described above with respect to FIG. 3B. In another embodiment, the multi-hop manager 140 performs the operations described herein, such as the operations described below with respect to method 600 of FIG. 6 and method 700 of FIG. 7.

In one embodiment, upon completing the 3 aggregation operations, the central entity or the respective mesh network device performing the transmit power calculations can generate an aggregate report that lists the mesh network device and their respective measurements and threshold parameters. FIG. 5 schematically illustrates an example aggregate report generated by the multi-hop power manager 140 operating in accordance with embodiments of the present disclosure. While the aggregate report 500 is shown as a rectangular table, various data structures including single or multi-dimensional arrays may be employed for storing the aggregate report in the memory of the network device (or central entity).

As shown in FIG. 5, for every discovered wireless access point, the aggregate report 500 may include a respective aggregate report entry visually represented by a row 510A-510N of the aggregate report 500. Each aggregate report entry may include the network identifier 520, path losses $G_{i,j}$ 530, noise floor values $N_i$ observed at the respective device, the interference threshold parameter 550 for the respective device, the data rate threshold parameter 560 (expressed as Si, the minimal received SINR for a particular MCS index). These values can be used to compute the transmit power level Pi 570 for the respective device. The aggregate report 500 may further include various other information, such as other network parameters that are omitted from FIG. 5 for clarity and conciseness.

Upon generating the aggregate report 500, the multi-hop power manager 140 may compute the transmit power levels for the mesh network device in the wireless mesh network. In the case of the multi-hop power manager 140 being at a central entity, the multi-hop power manager 140 can distribute information that represents the transmit power levels, as well as other information in the aggregate report 500 to the mesh network devices.

As noted herein above, in one embodiment, the mesh network device that computes information that represents the transmit power level for the mesh network devices in the wireless mesh network can broadcast or unicast data in the aggregate report 500 to other mesh network devices.

Figure 6:
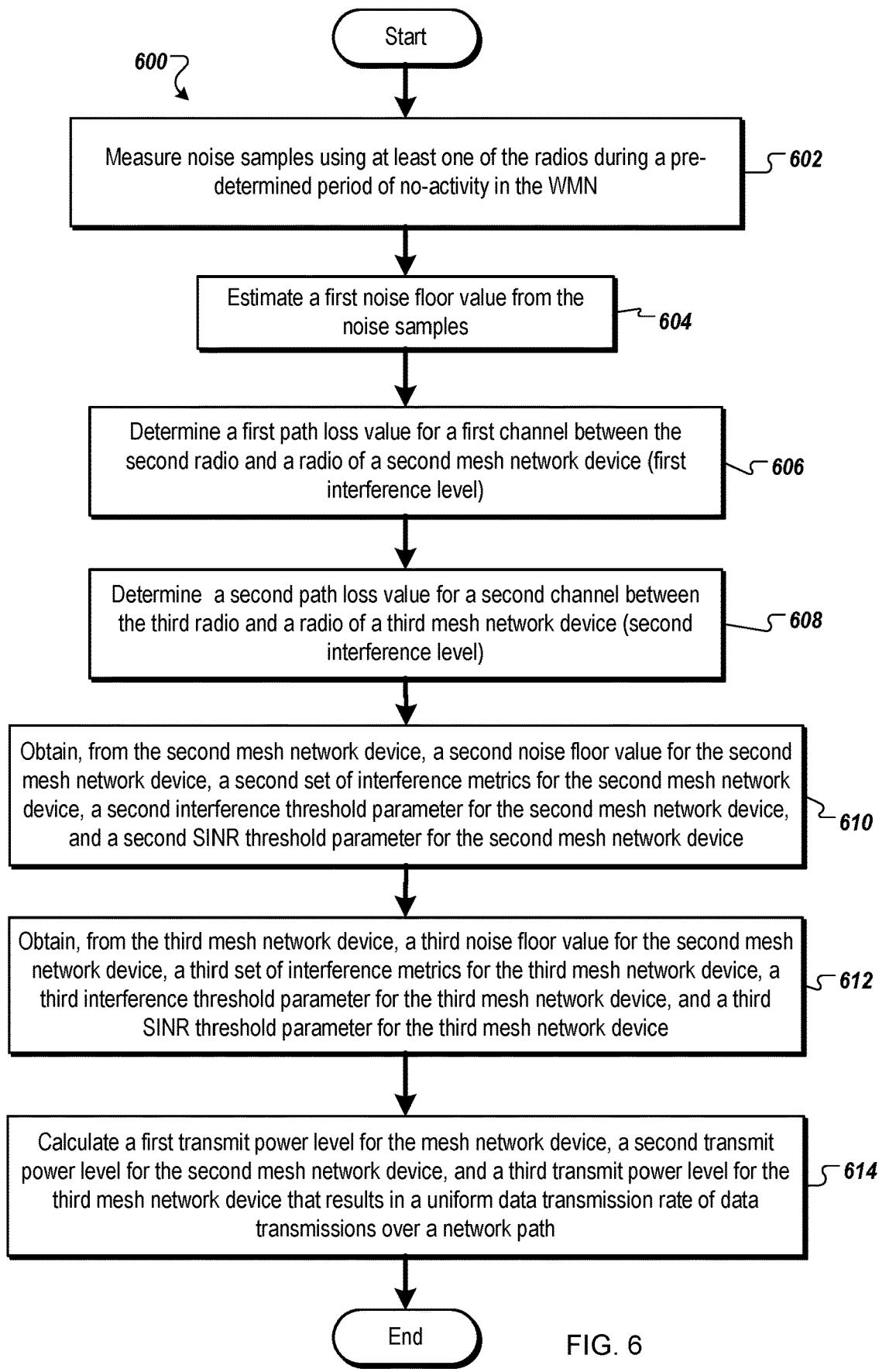
FIG. 6 is a flow diagram of one embodiment of a method of multi-level hop power management by a multi-hop power manager deployed at a mesh network device in a distributed manner, in accordance with embodiments of the present disclosure.

FIG. 6 is a flow diagram of one embodiment of a method 600 of multi-level hop power management by a multi-hop power manager deployed at a mesh network device in a distributed manner, in accordance with embodiments of the present disclosure. The method 600 may be performed by processing logic that includes hardware (e.g., circuitry, dedicated logic, programmable logic, microcode, etc.), software (e.g., instructions run on a processor to perform hardware simulation), or a combination thereof. In one embodiment, the method 600 may be performed by the multi-hop manager 140 deployed at any one of the mesh network devices of the wireless mesh network 100 of FIG. 1.

Referring to FIG. 6, the processing logic begins the method 600 by storing a first interference threshold parameter indicative of an amount of acceptable radio-frequency interference at the mesh network device and a first SINR threshold parameter (or other data rate threshold parameter) indicative of an acceptable data transmission rate for the mesh network device. At block 602, the processing logic measures noise samples using at least one of the radios of the mesh network device during a pre-determined period of no-activity in the WMN. The processing logic can optionally filter the noise samples to obtain filtered samples and compute an average value of the filtered samples to obtain the first noise floor value.

At block 604, the processing logic estimates a first noise floor value from the noise samples. At block 606, the processing logic determines a first path loss value ($G_{1,2}$) for a first communication channel between a second radio of the mesh network device and a radio of a second mesh network device. The first path loss value ($G_{1,2}$) is indicative of a first interference level (or other interference metric value or distribution function) of the first communication channel. At block 608, the processing logic determines a second path loss ($G_{1,3}$) value for a second communication channel between a third radio of the mesh network device and a radio of a third mesh network device. The second path loss value ($G_{1,3}$) is indicative of a second interference level of the second communication channel. The first interference level and the second interference level can be part of a first set of interference metrics for the mesh network device. This process may perform similar operations as those at blocks 606 and 608 for other radios of the mesh network device.

At block 610, the processing logic obtains, from the second mesh network device, a second noise floor value for the second mesh network device, a second set of interference metrics for the second mesh network device, a second interference threshold parameter for the second mesh network device, and a second SINR threshold parameter for the second mesh network device. The second set of interference metrics may correspond to path loss values of communication channels of the second mesh network device.

At block 612, the processing logic obtains, from the third mesh network device, a third noise floor value for the second mesh network device, a third set of interference metrics for the third mesh network device, a third interference threshold parameter for the third mesh network device, and a third SINR threshold parameter for the third mesh network device. The third set of interference metrics may correspond to path loss values of communication channels of the third mesh network device.

At block 614, the processing logic calculates a first transmit power level for the mesh network device, a second transmit power level for the second mesh network device, and a third transmit power level for the third mesh network device. The first, second, and third transmit power levels result in a uniform data transmission rate of data transmissions over a network path that traverse the mesh network device, the second network device, and the third network device. Once the transmit power levels are calculated, the method 600 may end.

In another embodiment, additional operations may be performed to distribute the transmit power levels to other devices, as described herein.

Also, the embodiments above are directed to the mesh network device having a first radio coupled to an omnidirectional antenna, a second radio selectively coupled to any one of a plurality of directional antennas, and a third radio selectively coupled to any one of the plurality of directional antennas. In another embodiment, the mesh network device includes a fourth radio selectively coupled to any one of the plurality of directional antennas and a fifth radio selectively coupled to any one of the plurality of directional antennas. In one embodiment with the fourth radio, the processing logic determines a third path loss value for a third communication channel between the fourth radio and a radio of a fourth mesh network device. The third path loss value is indicative of a third interference level of the third communication channel. The processing logic obtains, from the fourth mesh network device, a fourth noise floor value for the fourth mesh network device, a fourth set of interference metrics for the fourth mesh network device, a fourth interference threshold parameter for the fourth mesh network device, and a fourth SINR threshold parameter for the fourth mesh network device. The processing logic calculates the first transmit power level, the second transmit power level, the third transmit power level, and a fourth transmit power level for the fourth mesh network device that results in a uniform data transmission rate of data transmissions over a network path that traverses the mesh network device, the second network device, the third network device, and the fourth network device.

In some embodiments, subsequent to block 614, the processing logic optionally transmits, using the second radio with a specified transmit power, a first set of training frames over the first communication channel. This can be done to exchange information with other mesh network device. In a further embodiment with or without transmitting the first set of training frames, the processing logic receives, by the second radio, a second set of training frames over the first communication channel. Each of the second set of training frames may include an informational element identifying the specified transmit power level used by the radio of the second mesh network device to transmit the second set of training frames. The processing logic measures a RSSI value for the first communication channel. The RSSI value can be measured on a frame-by-frame basis or an average of RSSI values over a period of time. The processing logic determines the first path loss value using the specified transmit power level and the RSSI value.

Figure 7:
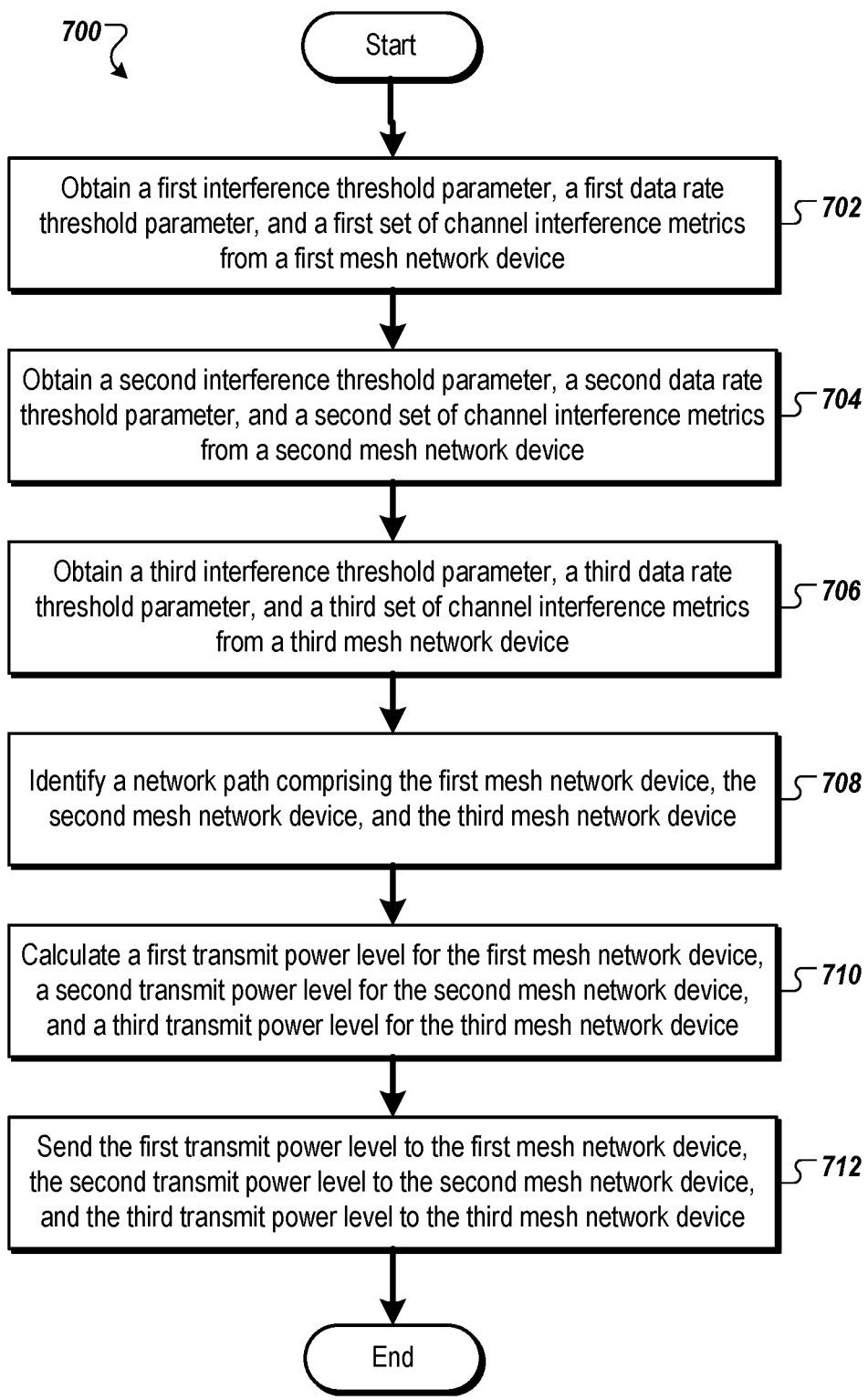
FIG. 7 is a flow diagram of one embodiment of a method of multi-level hop power management by a multi-hop power manager deployed at a central entity in a centralized manner, in accordance with embodiments of the present disclosure.

FIG. 7 is a flow diagram of one embodiment of a method 700 of multi-level hop power management by a multi-hop power manager deployed at a central entity in a centralized manner, in accordance with embodiments of the present disclosure. The method 700 may be performed by processing logic that includes hardware (e.g., circuitry, dedicated logic, programmable logic, microcode, etc.), software (e.g., instructions run on a processor to perform hardware simulation), or a combination thereof. In one embodiment, the method 600 may be performed by the multi-hop manager 140 deployed at a central entity, such as the mesh network control service 125 of FIG. 1.

Referring to FIG. 7, at block 702, the processing logic begins the method 700 by obtaining a first interference threshold parameter, a first data rate threshold parameter, and a first set of channel interference metrics from a first mesh network device. At block 704, the processing logic obtains a second interference threshold parameter, a second data rate threshold parameter, and a second set of channel interference metrics from a second mesh network device. At block 706, the processing logic obtains a third interference threshold parameter, a third data rate threshold parameter, and a third set of channel interference metrics from a third mesh network device. The method 700 may continue to obtain the metrics and threshold parameters from other mesh network device in the wireless mesh network.

At block 708, the processing logic identifies a network path that traverses the first mesh network device, the second mesh network device, and the third mesh network device. At block 710, the processing logic calculates a first transmit power level for the first mesh network device, a second transmit power level for the second mesh network device, and a third transmit power level for the third mesh network device. At block 712, the processing logic sends information that represents the first transmit power level to the first mesh network device, information that represents the second transmit power level to the second mesh network device, and information that represents the third transmit power level to the third mesh network device. It should be noted that data transmissions by each of the first mesh network device at the first transmit power, the second mesh network device at the second transmit power level, and the third mesh network device at the third transmit power level ensure a uniform network throughput stability through the network path. After block 712, the method 700 ends. In other embodiments, additional operation may be performed.

In one embodiment, to obtain the first set, the second set, and the third set of channel interference metrics, the processing logic can schedule data transmissions by one of the mesh network device while the others listen to measure the interference caused by the one mesh network device. In one embodiment, the processing logic schedules first data transmissions by the first mesh network device in a first time slot of a time division multiple access (TDMA) scheme. The processing logic schedules second data transmissions by the second mesh network device in a second time slot of the TDMA scheme and schedules third data transmissions by the third mesh network device in a third time slot of the TDMA scheme. The RSSI values can be measured at the respective devices to determine the respective set of interference metrics for each of the first mesh network device, the second mesh network device, and the third mesh network device.

As described herein, the data rate threshold parameter is a value or a range of values. The data rate threshold can also be expressed as a distribution function, such as a distribution function of SINR. In another embodiment, the data rate threshold parameter is a distribution function of a frequency distribution model.

In another embodiment, the processing logic obtains, from a first mesh network device, a first noise floor value, a first interference threshold parameter, a first data rate threshold parameter, and a first set of channel interference metrics. The processing logic obtains, from a second mesh network device, a second noise floor value, a second interference threshold parameter, a second data rate threshold parameter, and a second set of channel interference metrics. The processing logic obtains, from a third mesh network device, a third noise floor value, a third interference threshold parameter, a third data rate threshold parameter, and a third set of channel interference metrics. The processing logic identifies a network path that traverses the first mesh network device, the second mesh network device, and the third mesh network device. The network path may include more than these three mesh network devices. The processing logic calculates a first transmit power level for the first mesh network device, a second transmit power level for the second mesh network device, and a third transmit power level for the third mesh network device. As noted above, data transmissions by each of the first mesh network device at the first transmit power, the second mesh network device at the second transmit power level, and the third mesh network device at the third transmit power level ensure uniform network throughput stability through the network path.

In embodiments, where obtaining the metrics and parameters, identifying the network path, and calculating the transmit power levels are done by a mesh network control service, the processing logic sends, by the mesh network control service, information that represents the first transmit power level to the first mesh network device, information that represents the second transmit power level to the second mesh network device, and information that represents the third transmit power level to the third mesh network device.

In embodiments where obtaining the metrics and parameters, identifying the network path, and calculating the transmit power levels are done by a first mesh network device in the wireless mesh network, the processing logic transmits, using a radio of the first mesh network device, first data at the first transmit power level. The processing logic receives, by a radio of the first mesh network device, second data from the second mesh network device transmitted at the second transmit power level. The processing logic may also receive, by a radio of the first mesh network device, third data from the third mesh network device transmitted at the third transmit power level. In a further embodiment, the processing logic stores the first interference threshold parameter and the first data rate threshold parameter. The first interference threshold parameter is indicative of an amount of acceptable radio-frequency interference at the first mesh network device. The processing logic measures noise samples using one or more radios of the first mesh network device during a pre-determined period of no-activity in the wireless mesh network. The processing logic, as part of obtaining the first noise floor value, estimates the first noise floor value from the noise samples. The processing logic may filter the noise samples to obtained filtered samples and computer an average or mean value of the filtered samples to obtain the first noise floor value.

In one embodiment, to obtain the first set of channel interference metrics, the processing logic determines a first path loss value for a first communication channel between a first radio of the first mesh network device and a radio of the second mesh network device. The first path loss value is indicative of a first interference level of the first communication channel. The processing logic determines a second path loss value for a second communication channel between a second radio of the first mesh network device and a radio of the third mesh network device. The second path loss value is indicative of a second interference level of the second communication channel. The first interference level and the second interference level form the first set of interference metrics for the first mesh network device.

In another embodiment, to obtain the first set of channel interference metrics in a centralized configuration, the processing logic receives, by a radio of the first mesh network device, a management frame over a first communication channel between the radio and a radio of the second mesh network device. The management frame includes a transmit power level used by the radio of the second mesh network device to transmit the management frame. The processing logic measures a RSSI value for the first communication channel. The processing logic determines a first path loss value using the transmit power level and the RSSI value. The first path loss value may be one of the first set of channel interference metrics.

In another embodiment, to obtain the first set of channel interference metrics in a distributed configuration, the processing logic, by a radio of the first mesh network device, a frame over a first communication channel between the radio and a radio of the second mesh network device. The processing logic measures a RSSI value for the first communication channel and correlates the RSSI value with information already stored about the transmit power level corresponding to a transmitter MAC address of the radio of the second mesh network device. The information that represents the transmit power level is stored in connection with the transmitter MAC address. The processing logic determines a first path loss value using the transmit power level and the RSSI value. The first path loss value is one of the first set of channel interference metrics.

In another embodiment, to obtain the first set of channel interference metrics in a centralized configuration, the processing logic schedules first data transmissions by the first mesh network device in a first time slot of a TDMA scheme, schedules second data transmissions by the second mesh network device in a second time slot of the TDMA scheme, and schedules third data transmissions by the third mesh network device in a third time slot of the TDMA scheme. The sets of data transmissions by the respective device can be used to measure the interference caused by the respective device at the other mesh network device.

Figure 8:
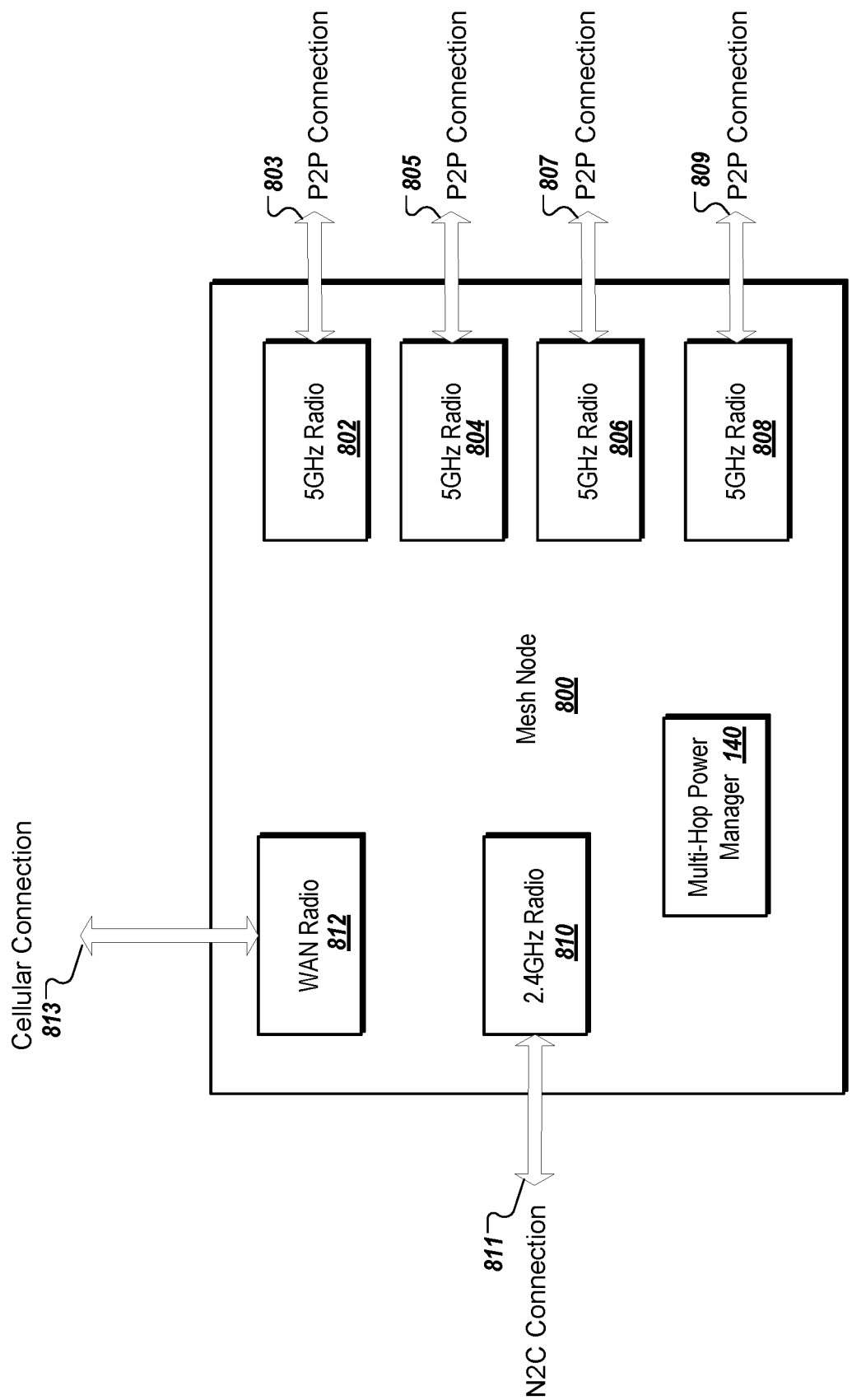
FIG. 8 is a block diagram of a mesh node 300 with multiple radios and a multi-hop power manager according to one embodiment.

FIG. 8 is a block diagram of a mesh node 800 with multiple radios and a multi-hop power manager 140 according to one embodiment. The operations of the multi-hop power manager 140 are described above with respect to FIGS. 3B-7. The mesh node 800 includes a first 5 GHz radio 802, a second 5 GHz radio 804, a third 5 GHz radio 806, a fourth 5 GHz radio 808, a 2.4 GHz radio 810, and a cellular radio 812. The first 5 GHz radio 802 creates a first P2P wireless connection 803 between the mesh node 800 and another mesh node (not illustrated) in a WMN. The second 5 GHz radio 804 creates a second P2P wireless connection 805 between the mesh node 800 and another mesh node (not illustrated) in the WMN. The third 5 GHz radio 806 creates a third P2P wireless connection 807 between the mesh node 800 and another mesh node (not illustrated) in the WMN. The fourth 5 GHz radio 808 creates a fourth P2P wireless connection 809 between the mesh node 800 and another mesh node (not illustrated) in the WMN. The 2.4 GHz radio 810 creates a N2C wireless connection 811 between the mesh node 800 and a client consumption device (not illustrated) in the WMN. The N2C wireless connection may be one of a second set of one or more WLAN connections that operate at a second frequency of approximately 2.4 GHz. The cellular radio 812 creates a cellular connection between the mesh node 800 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In some embodiments, the mesh node 800 may be any one of the mesh network device described herein. In one embodiment, the mesh node 800 may be an ingress node or a mini-POP node that has attached storage and a network connection to access content outside of the wireless mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

During operation, the mesh node 800 may receive a first request for a first content file from the first client consumption device over the first N2C connection 811. The mesh node 800 sends a second request for the first content file to a second network hardware device through the network backbone via a first set of zero or more intervening network hardware devices between the first network hardware device and the second network hardware device. The mesh node 800 receives the first content file through the network backbone via the first set of zero or more intervening network hardware devices and sends the first content file to the first client consumption device over the first N2C connection 811. In a further embodiment, the mesh node 800 includes the WAN radio 812 to wirelessly connect to a MNCS device by a cellular connection 813 to exchange control data.

In some embodiments, a path between the mesh node 800 and an ingress node (or any other mesh network device) could include zero or more hops of intervening network hardware devices. In some cases, the path may include up to 12-15 hops within a mesh network of 100×100 network hardware devices deployed in the WMN. In some embodiments, a number of network hardware devices in the WMN is greater than fifty. The WMN may include hundreds, thousands, and even tens of thousands of network hardware devices.

In some embodiments, the mesh node 800 includes memory to store content files, control and command data, as well as the aggregate data described herein for multi-hop power management. The memory of the first network hardware device may be volatile memory, non-volatile memory, or a combination of both. When a content file is not stored in the memory or the storage of the mesh node 800, the mesh node 800 generates and sends a request to another node in the wireless mesh network. Intervening network hardware devices can make similar determinations to locate the content file in the WMN. In the event that the first content file is not stored in the WMN, the content file can be requested from the mini-POP node. When the mini-POP node does not store the content file, the mini-POP can take action to obtain the first content file, such as requesting the first content file from a CDN over a point-to-point link. Alternatively, the human in the loop process can be initiated as described herein.

In a further embodiment, the P2P wireless connections 803, 805, 807, 809 are WLAN connections that operate in a first frequency range and the N2C connections 811 are WLAN connections that operate in a second frequency range. In another embodiment, the P2P wireless connections 803, 805, 807, 809 operate at a first frequency of approximately 5.0 GHz and the N2C connections 811 operate at a second frequency of approximately 2.4 GHz.

Figure 9:
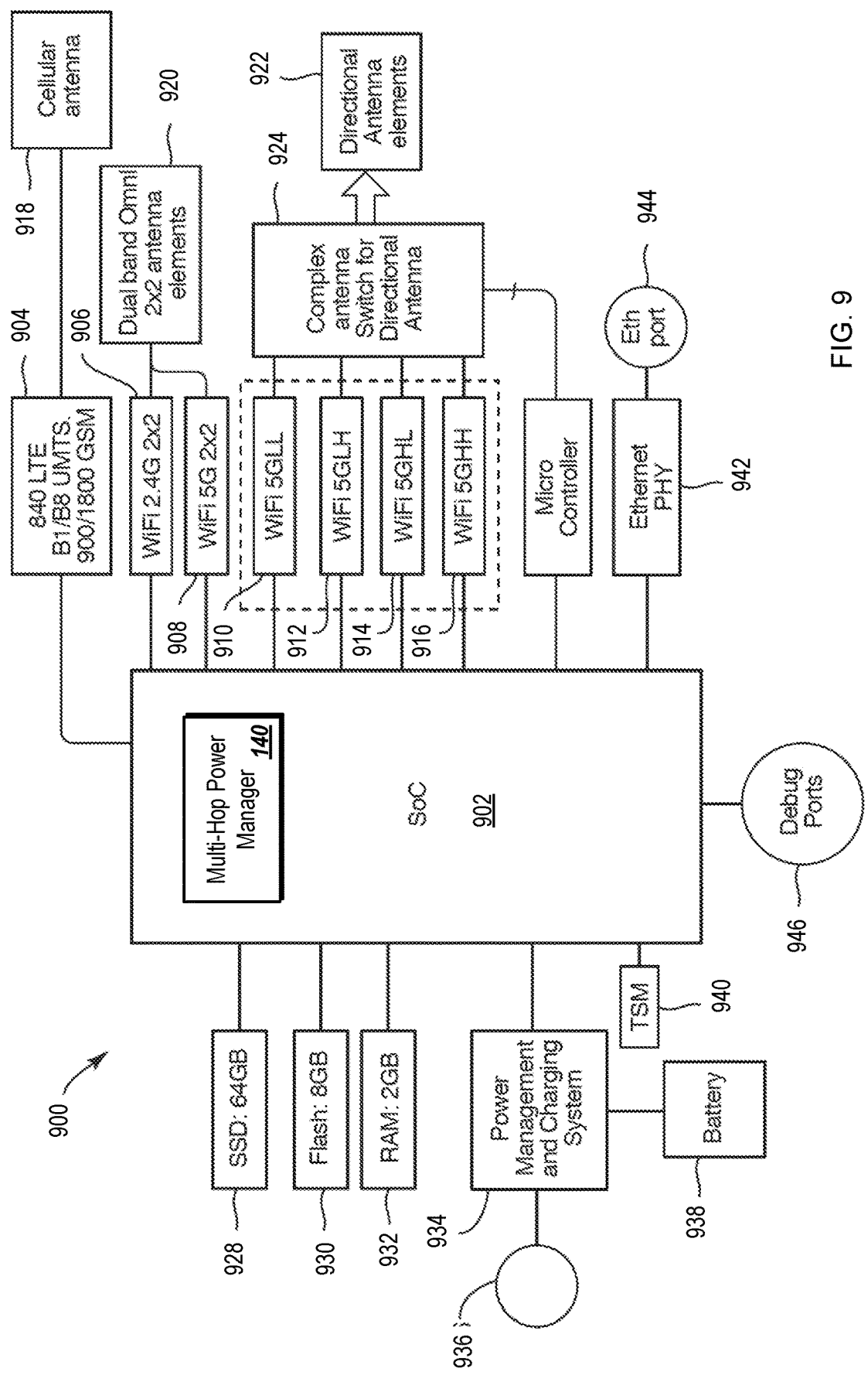
FIG. 9 is a block diagram of a mesh network device 900 with a multi-hop power manager 140 according to one embodiment.

FIG. 9 is a block diagram of a mesh network device 900 with a multi-hop power manager 140 according to one embodiment. The mesh network device 900 may be one of many mesh network devices organized in a WMN (e.g., WMN 100). The mesh network device 900 is one of the nodes in a mesh topology in which the mesh network device 900 cooperates with other mesh network devices in distribution of content files to client consumption devices in an environment of limited connectivity to broadband Internet infrastructure, as described herein. The mesh network device 900 may be the mini-POP node 102 of FIG. 1. Alternatively, the mesh network device 900 may be any one of the mesh network devices 109-110 of FIG. 1. In another embodiment, the mesh network device 900 is any one of the network hardware devices 202-210 of FIG. 2. In another embodiment, the mesh network device 900 is the mesh node 300 of FIG. 3.

The mesh network device 900 includes a system on chip (SoC) 902 to process data signals in connection with communicating with other mesh network devices and client consumption devices in the WMN. The SoC 902 includes a processing element (e.g., a processor core, a central processing unit, or multiple cores) that processes the data signals and controls the radios to communicate with other devices in the WMN. In one embodiment, the SoC 902 is a dual core SoC, such as the ARM A15 1.5 GHz with hardware network acceleration. The SoC 902 may include memory and storage, such as 2 GB DDR RAM and 64 GB eMMC coupled to the SoC 902 via external HDD interfaces (e.g., SATA, USB3, or the like). The SoC 902 can implement the multi-hop power manager 140 as processing logic comprising software, firmware, hardware, or any combination thereof. The SoC 902 may include multiple RF interfaces, such as a first interface to the first RF module 904 (e.g., HSCI interface for cellular module (3G)), a second interface to the WLAN 2.4 GHz radio 906, a third interface to the WLAN 2.4 GHz radio 908, and multiple interfaces to the WLAN 5 GHz radios, such as on a PCIe bus. In one embodiment, the SoC 902 is the IPQ8064 Qualcomm SoC or the IPQ4029 Qualcomm SoC. Alternatively, other types of SoCs may be used, such as the Annapurna SoC, or the like. Alternatively, the mesh network device 900 may include an application processor that is not necessarily considered to be a SoC.

The mesh network device 900 may also include memory and storage. For example, the mesh network device 900 may include SSD 64 GB 928, 8 GB Flash 930, and 2 GB 932. The memory and storage may be coupled to the SoC 902 via one or more interfaces, such as USB 3.0, SATA, or SD interfaces. The mesh network device 900 may also include a single Ethernet port 944 that is an ingress port for Internet Protocol (IP) connection. The Ethernet port 944 is connected to the Ethernet PHY 942, which is connected to the SoC 902. The Ethernet port 944 can be used to service the mesh network device 900. Although the Ethernet port 944 could provide wired connections to client devices, the primary purpose of the Ethernet port 944 is not to connect to client devices, since the 2.4 GHz connections are used to connect to clients in the WMN. The mesh network device 900 may also include one or more debug ports 946, which are coupled to the SoC 902. The memory and storage may be used to cache content, as well as store software, firmware or other data for the mesh network device 900.

The mesh network device 900 may also include a power management and charging system 934. The power management and charging system 934 can be connected to a power supply 936 (e.g., 240V outlet, 120V outlet, or the like). The power management and charging system 934 can also connect to a battery 938. The battery 938 can provide power in the event of power loss. The power management and charging system 934 can be configured to send a SoS message on power outage and backup system state. For example, the WLAN radios can be powered down, but the cellular radio can be powered by the battery 938 to send the SoS message. The battery 938 can provide limited operations by the mesh network device 900, such as for 10 minutes before the entire system is completely powered down. In some cases, power outage will likely affect a geographic area in which the mesh network device 900 is deployed (e.g., power outage that is a neighborhood wide phenomenon). The best option may be to power down the mesh network device 900 and let the cloud service (e.g., back end service) know of the outage in the WMN. The power management and charging system 934 may provide a 15V power supply up to 21 watts to the SoC 902. Alternatively, the mesh network device 900 may include more or less components to operate the multiple antennas as described herein.

The mesh network device 900 includes a first radio frequency (RF) module 904 coupled between the SoC 902 and a cellular antenna 918. The first RF module 904 supports cellular connectivity using the cellular antenna 918. In one embodiment, the cellular antenna 918 includes a primary wide area network (WAN) antenna element and a secondary WAN antenna element. The first RF module 904 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF module 904 may support other bands, as well as other cellular technologies. The mesh network device 900 may include a GPS antenna and corresponding GPS module to track the location of the mesh network device 900, such as moves between homes. However, the mesh network device 900 is intended to be located inside a structure, the GPS antenna and module may not be used in some embodiments.

The mesh network device 900 includes a first set of wireless local area network (WLAN) modules 906, 908 coupled between the SoC 902 and dual-band omnidirectional antennas 920. A first WLAN module 906 may support WLAN connectivity in a first frequency range using one of the dual-band omnidirectional antennas 920. A second WLAN module 908 may support WLAN connectivity in a second frequency range using one of the dual-band omnidirectional antennas 920. The dual-band omnidirectional antennas 920 may be two omnidirectional antennas for 2.4 GHz. The directional antennas 922 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 920 and the directional antennas 922 can be implemented within a fully switchable antenna architecture controlled by micro controller 926. For example, each 5 GHz radio can choose any 2 sectors (for 2 2×2 MU-MIMO streams).

The mesh network device 900 includes a second set of WLAN modules 910-916 coupled between the SoC 902 and antenna switching circuitry 924. The second set of WLAN modules 910-916 support WLAN connectivity in the second frequency range using a set of directional antennas 922. The second set of WLAN modules 910-916 is operable to communicate with the other mesh network devices of the WMN. The antenna switching circuitry 924 is coupled to a micro controller 926. The micro controller 926 controls the antenna switching circuitry 924 to select different combinations of antennas for wireless communications between the mesh network device 900 and the other mesh network devices, the client consumption devices, or both. For example, the micro controller 926 can select different combinations of the set of directional antennas 922.

In another embodiment, a filter switch bank is coupled between the antenna switching circuitry 924 and the second set of WLAN modules 910-916. In another embodiment, the filter switch bank can be implemented within the antenna switching circuitry 924.

In the depicted embodiment, the first set of WLAN modules include a first a first 2×2 2.4 GHz MIMO radio 906 and a 2×2 5 GHz MIMO radio 908. The second set of WLAN modules includes a first 2×2 5 GHz MIMO radio 910 ("5GLL"), a second 2×2 5 GHz MIMO radio 912 ("5GLH"), a third 2×2 5 GHz MIMO radio 914 ("5GHL"), and a fourth 2×2 5 GHz MIMO radio 916 ("5GHH"). The dual-band omnidirectional antennas 920 may include a first omnidirectional antenna and a second omnidirectional antenna (not individually illustrated in FIG. 9). The set of directional antennas 922 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 900 can handle antenna switching in a static manner. The SoC 902 can perform sounding operations with the WLAN radios to determine a switch configuration. Switching is not done on a per packet basis or at a packet level. The static switch configuration can be evaluated a few times a day by the SoC 902. The SoC 902 can include the intelligence for switching decision based on neighbor sounding operations done by the SoC 902. The micro controller 926 can be used to program the antenna switching circuitry 924 (e.g., switch matrix) since the mesh network device 900 may be based on CSMA-CA, not TDMA. Deciding where the data will be coming into the mesh network device 900 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 900 can adapt a beam patter to be essentially fixed since the mesh network devices are not intended to move once situated.

In one embodiment, the antenna switching circuitry 924 includes multiple diplexers and switches to connect different combinations of antennas to the multiple radios. One configuration for the antenna switching circuitry 924 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the network device 900.

Figure 10:
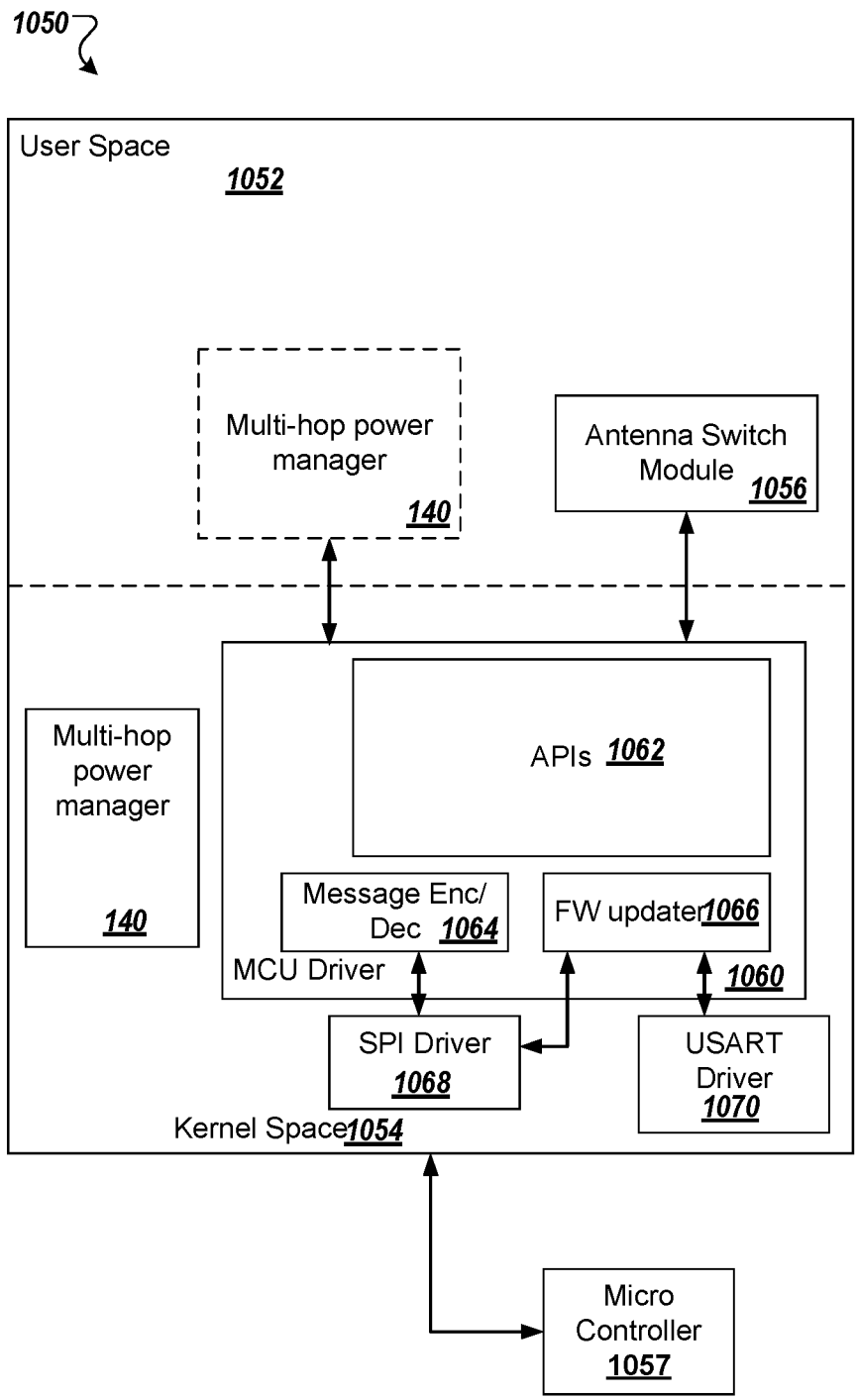
FIG. 10 is a block diagram of an application processor in which the multi-hop power manager operating in accordance with embodiments of the present disclosure may be implemented.

FIG. 10 is a block diagram of an application processor in which the multi-hop power manager 140 operating in accordance with embodiments of the present disclosure may be implemented. The application processor 1050 executes an operating system that segregates memory (virtual memory) into user space 1052 and kernel space 1054. In this embodiment, the multi-hop power manager 140 runs in the user space 1052. In other embodiments, some or the entire multi-hop power manager 140 can be implemented in the kernel space 1054. The multi-hop power manager 140 may be instructions that when executed by the application processor 1050 perform various power management operations as described herein. The application processor 1150 can communicate with neighbor network devices to route data traffic on a network backbone of multiple P2P wireless connections between the network devices.

In the kernel space 1154, a micro controller unit (MCU) driver 1160 can execute. The MCU driver 1160 may include multiple application programming interfaces (APIs) 1162 to interface to other components, such as the radios and micro controller, as described herein. The APIs 1162 can communicate messages to other components and may use a message encoder/decoder 1164 to encode and decode these messages. The APIs 1162 may include an API for getting firmware versions, an API for updating the firmware, and an API for getting radio information (e.g., radio configuration, antenna configuration, channel information, chamber/sector information, or the like). The MCU driver 1160 may also include a firmware (FW) updater 1166. Also, the kernel space 1154 may include a serial packet interface (SPI) driver 1168 and a Universal Synchronous/Asynchronous Receiver/Transmitter (USART) driver 1170.

In one embodiment, there is an interface mechanism between the user space 1152 and kernel space 1154 that has minimum latency. For example, in cases when there is an invalid configuration being input by an application, such as the multi-hop power manager 140, the error should be reported as quickly as possible to the application. The application processor 1150 may also include power management modules in the user space 1152 or in the kernel space 1154 since the application processor 1150 could be operating in a battery-backed operating state during power outages.

Figure 11:
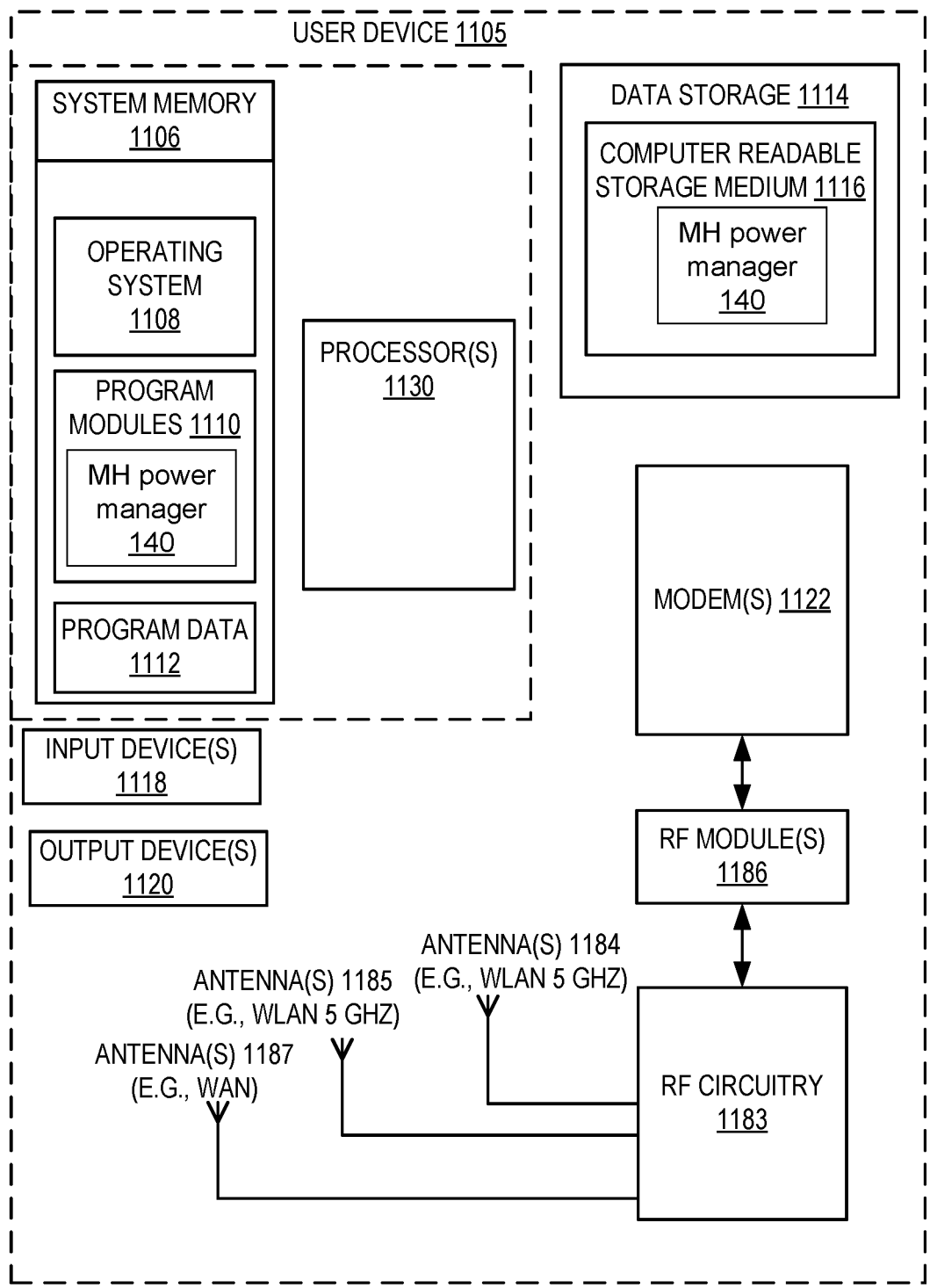
FIG. 11 is a block diagram of a network hardware device 1100 with a multi-hop power manager 140 according to one embodiment.

FIG. 11 is a block diagram of a network hardware device 1100 with a multi-hop power manager 140 according to one embodiment. The network hardware device 1100 may correspond to the network hardware device 102-110 of FIG. 1. In another embodiment, the network hardware device 1100 may correspond to any of the wireless mesh point stations (MP STA) 210A-210Z, mesh access points (MAP) 220A-220K, and mesh portals (MPP) 230A-220M of FIG. 2. In another embodiment, the network hardware device 1100 may correspond to the nodes 401-410 of FIG. 4. In another embodiment, the network hardware device 1100 may correspond to the mesh node 800 of FIG. 8. In another embodiment, the network hardware device 1100 may correspond to the mesh network device 900 of FIG. 9. In another embodiment, the network hardware device 1100 may correspond to the application processor 1050 of FIG. 10. Alternatively, the network hardware device 1100 may be other electronic devices, as described herein.

The network hardware device 1100 includes one or more processor(s) 1130, such as one or more CPUs, microcontrollers, field programmable gate arrays, or other types of processors. The network hardware device 1100 also includes system memory 1106, which may correspond to any combination of volatile and/or non-volatile storage mechanisms. The system memory 1106 stores information that provides operating system component 1108, various program modules 1110, program data 1112, and/or other components. The program modules 1110 may include instructions of the multi-hop power manager 140. In one embodiment, the system memory 1106 stores instructions of methods to control operation of the network hardware device 1100. The network hardware device 1100 performs functions by using the processor(s) 1130 to execute instructions provided by the system memory 1106.

The network hardware device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the network hardware device 1100, the system memory 1106 and the processor(s) 1130 also constituting computer-readable media. The network hardware device 1100 may also include one or more input devices 1118 (keyboard, mouse device, specialized selection keys, etc.) and one or more output devices 1120 (displays, printers, audio output mechanisms, etc.).

The network hardware device 1100 further includes a modem 1122 to allow the network hardware device 1100 to communicate via a wireless connections (e.g., such as provided by the wireless communication system) with other computing devices, such as remote computers, an item providing system, and so forth. The modem 1122 can be connected to one or more RF modules 1186. The RF modules 1186 may be a WLAN module, a WAN module, PAN module, GPS module, or the like. The antenna structures (antenna(s) 1184, 1185, 1187) are coupled to the RF circuitry 1183, which is coupled to the modem 1122. The RF circuitry 1183 may include radio front-end circuitry, antenna switching circuitry, impedance matching circuitry, or the like. In one embodiment, the RF circuitry 1183 includes the RFFE circuitry with high selectivity performance as described in the various embodiments of FIGS. 5-12. The antennas 1184 may be GPS antennas, NFC antennas, other WAN antennas, WLAN or PAN antennas, or the like. The modem 1122 allows the network hardware device 1100 to handle both voice and non-voice communications (such as communications for text messages, multimedia messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1122 may generate signals and send these signals to antenna(s) 1184 of a first type (e.g., WLAN 5 GHz), antenna(s) 1185 of a second type (e.g., WLAN 2.4 GHz), and/or antenna(s) 1187 of a third type (e.g., WAN), via RF circuitry 1183, and RF module(s) 1186 as descried herein. Antennas 1184, 1185, 1187 may be configured to transmit in different frequency bands and/or using different wireless communication protocols. The antennas 1184, 1185, 1187 may be directional, omnidirectional, or non-directional antennas. In addition to sending data, antennas 1184, 1185, 1187 may also receive data, which is sent to appropriate RF modules connected to the antennas. One of the antennas 1184, 1185, 1187 may be any combination of the antenna structures described herein.

In one embodiment, the network hardware device 1100 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1122 is shown to control transmission and reception via antenna (1184, 1185, 1187), the network hardware device 1100 may alternatively include multiple modems, each of which is configured to transmit/receive data via a different antenna and/or wireless transmission protocol.

Figure 12:
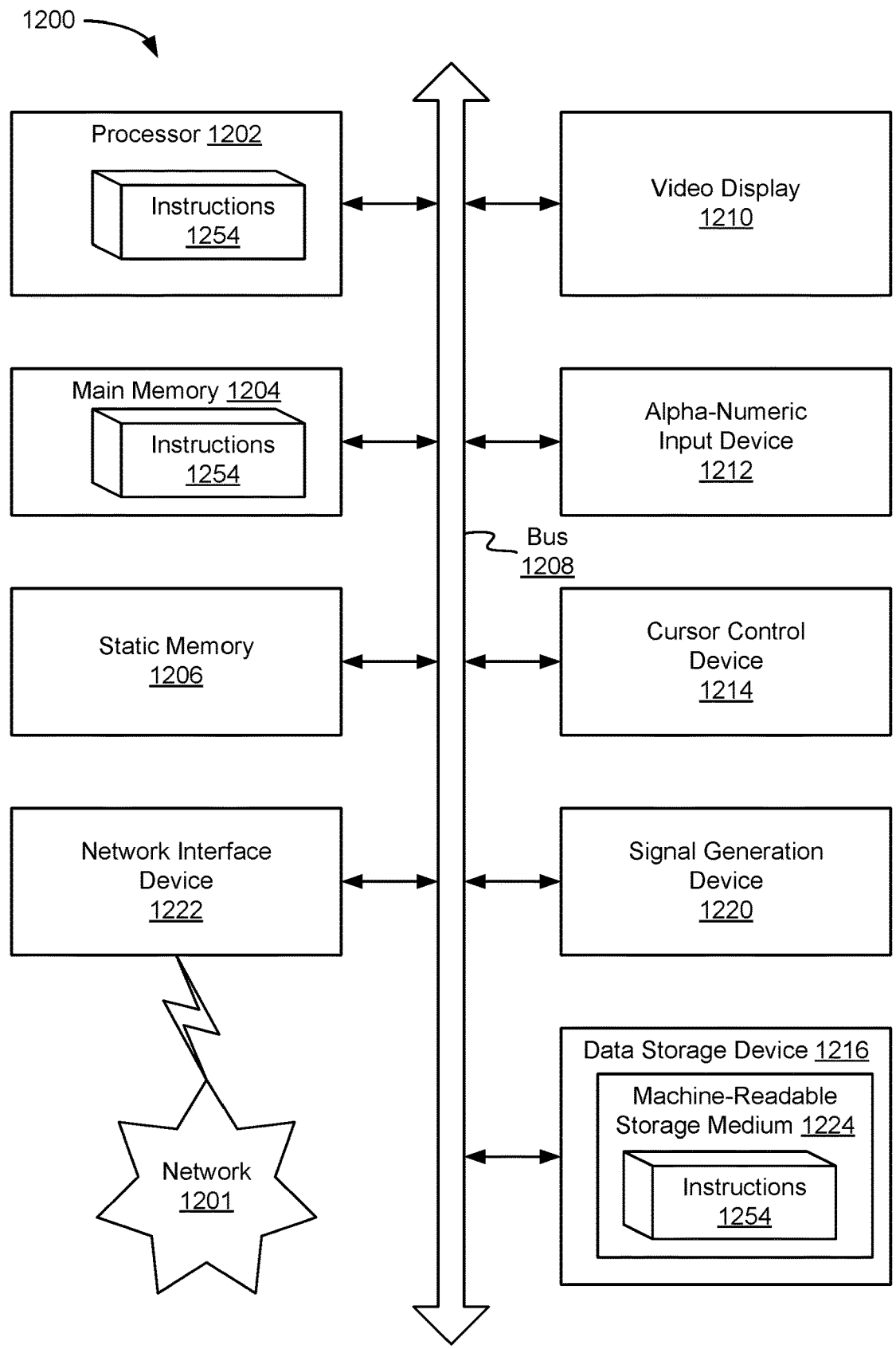
FIG. 12 illustrates a component diagram of a computer system which may implement one or more methods of multi-hop power management described herein.

FIG. 12 illustrates a component diagram of a computer system which may implement one or more methods of multi-hop power management described herein. A set of instructions for causing the computer system 1200 to perform any one or more of the methods discussed herein may be executed by the computer system 1200. In one embodiment, the computer system 1200 may implement the functions of the mesh network control service 125 of FIG. 1. Alternatively, the computer system 1200 may implement functions of the multi-hop power manager 140 in a central entity.

In one embodiment, the computer system 1200 may be connected to other computer systems by a network 1201 provided by a Local Area Network (LAN), an intranet, an extranet, the Internet or any combination thereof. The computer system may operate in a collection of one or more computers to implement a cloud computing system. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 1200 includes a processing device 1202, a main memory 1204 (e.g., read-only memory (ROM), flash memory, dynamic random access memory (DRAM) such as synchronous DRAM (SDRAM), etc.), a static memory 1206 (e.g., flash memory, static random access memory (SRAM), etc.) and a data storage device 1216, which communicate with each other via a bus 1208.

In one embodiment, the processing device 1202 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 1202 may therefore include multiple processors. The processing device 1202 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor or the like.

In one embodiment, the computer system 1200 may further include one or more network interface devices 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and a signal generation device 1220 (e.g., a speaker).

In one embodiment, the data storage device 1218 may include a computer-readable storage medium 1224 on which is stored one or more sets of instructions 1254 embodying any one or more of the methods or functions described herein. The instructions 1254 may also reside, completely or at least partially, within the main memory 1204 and/or within the processing device 1202 during execution thereof by the computer system 1200; the main memory 1204 and the processing device 1202 also constituting machine-readable storage media.

While the computer-readable storage medium 1224 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methods described herein. Examples of computer-readable storage media include, but not limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A mesh network device deployed in a wireless mesh network (WMN), the mesh network device comprising:
a first radio coupled to an omnidirectional antenna;
a second radio selectively coupled to any one of a plurality of directional antennas;
a third radio selectively coupled to any one of the plurality of directional antennas;
an application processor coupled to the first radio, the second radio, and the third radio, wherein the application processor:
stores a first interference threshold parameter indicative of an amount of acceptable radio-frequency interference at the mesh network device;
stores a first signal-to-interference-plus-noise ratio (SINR) threshold parameter indicative of an acceptable data transmission rate for the mesh network device;
measures radio-frequency (RF) noise samples using at least one of the first radio, the second radio, and the third radio, during a pre-determined period of no-activity in the WMN, the RF noise samples are indicative of RF power measured at the at least one of the first radio, the second radio, and the third radio at a specified frequency;
estimates a first noise floor value from the RF noise samples;
determines a first path loss value ($G_{1,2}$) for a first communication channel between the second radio and a radio of a second mesh network device, wherein the first path loss value ($G_{1,2}$) is indicative of a first amount of interference affecting transmissions on the first communication channel;
determines a second path loss value ($G_{1,3}$) for a second communication channel between the third radio and a radio of a third mesh network device, wherein the second path loss value ($G_{1,3}$) is indicative of a second amount of interference affecting transmissions on the second communication channel, wherein the first amount of interference and the second amount of interference form a first set of interference metrics for the mesh network device;

obtains, from the second mesh network device, second data comprising a second noise floor value for the second mesh network device, a second set of interference metrics for the second mesh network device, a second interference threshold parameter for the second mesh network device, and a second SINR threshold parameter for the second mesh network device;

obtains, from the third mesh network device, third data comprising a third noise floor value for the second mesh network device, a third set of interference metrics for the third mesh network device, a third interference threshold parameter for the third mesh network device, and a third SINR threshold parameter for the third mesh network device; and calculates a first transmit power level for the mesh network device, a second transmit power level for the second mesh network device, and a third transmit power level for the third mesh network device that results in a minimum data transmission rate of data transmissions over each hop of a network path that traverses the mesh network device, the second mesh network device, and the third mesh network device, wherein the application processor calculates the first transmit power, the second transmit power level, and the third transmit power level using the first noise floor value, the first set of interference metrics, the first interference threshold parameter, the first SINR threshold parameter, the second data, and the third data;

sends information that represents the second transmit power level to the second mesh network device via the second radio; and sends information that represents the third transmit power level to the third mesh network device via the third radio.

2. The mesh network device of claim 1, further comprising a fourth radio selectively coupled to any one of the plurality of directional antennas, wherein the application processor further:

determines a third path loss value for a third communication channel between the fourth radio and a radio of a fourth mesh network device, wherein the third path loss value is indicative of a third amount of interference of affecting transmissions on the third communication channel;

obtains, from the fourth mesh network device, a fourth noise floor value for the fourth mesh network device, a fourth set of interference metrics for the fourth mesh network device, a fourth interference threshold parameter for the fourth mesh network device, and a fourth SINR threshold parameter for the fourth mesh network device; and calculates the first transmit power level, the second transmit power level, the third transmit power level, and a fourth transmit power level for the fourth mesh network device that results in a uniform data transmission rate of data transmissions over a network path that traverses the mesh network device, the second mesh network device, the third mesh network device, and the fourth mesh network device.

3. The mesh network device of claim 1, wherein the application processor further:

transmits, using the second radio with a maximum transmit power level, a first set of frames over the first communication channel;

receives, by the second radio, a second set of frames over the first communication channel, wherein each of the second set of frames comprises an informational element identifying the maximum transmit power level used by the radio of the second mesh network device to transmit the second set of frames;

measures a receive signal strength indicator (RSSI) value for the first communication channel; and determines the first path loss value by dividing the RSSI value by the maximum transmit power level.

4. A method comprising:

obtaining, from a first mesh network device, first data, the first data comprising a first noise floor value, a first interference threshold parameter, a first data rate threshold parameter, and a first set of channel interference metrics;

obtaining, from a second mesh network device, second data, the second data comprising a second noise floor value, a second interference threshold parameter, a second data rate threshold parameter, and a second set of channel interference metrics;

obtaining, from a third mesh network device, third data, the third data comprising a third noise floor value, a third interference threshold parameter, a third data rate threshold parameter, and a third set of channel interference metrics;

identifying a network path that traverses the first mesh network device, the second mesh network device, and the third mesh network device; and calculating a first transmit power level for the first mesh network device, a second transmit power level for the second mesh network device, and a third transmit power level for the third mesh network device using the first data, the second data, and the third data, wherein transmitting data by each of the first mesh network device at the first transmit power level, the second mesh network device at the second transmit power level, and the third mesh network device at the third transmit power level ensures at least a specified minimum data rate over each hop in the network path.

5. The method of claim 4, wherein the obtaining, the identifying, and the calculating are performed by a mesh network control service, and wherein the method further comprises:

sending, by the mesh network control service, information that represents the first transmit power level to the first mesh network device;

sending, by the mesh network control service, information that represents the second transmit power level to the second mesh network device; and sending, by the mesh network control service, information that represents the third transmit power level to the third mesh network device.

6. The method of claim 4, wherein the obtaining, the identifying, and the calculating are performed by the first mesh network device, and wherein the method further comprises:

transmitting, using a radio of the first mesh network device, first data at the first transmit power level; and receiving, by a radio of the first mesh network device, second data from the second mesh network device.

7. The method of claim 4, wherein the obtaining, the identifying, and the calculating are performed by the first mesh network device, and wherein the method further comprises
measuring noise samples using one or more radios of the first mesh network device during a pre-determined period of no-activity;
filtering the noise samples to obtained filtered samples; and
computing an average value of the filtered samples to obtain the first noise floor value.

8. The method of claim 7, wherein the obtaining the first set of channel interference metrics comprises:
determining a first path loss value for a first communication channel between a first radio of the first mesh network device and a radio of the second mesh network device, wherein the first path loss value is indicative of a first interference level of the first communication channel; and
determining a second path loss value for a second communication channel between a second radio of the first mesh network device and a radio of the third mesh network device, wherein the second path loss value is indicative of a second interference level of the second communication channel.

9. The method of claim 4, wherein the first data rate threshold parameter is a distribution function of a signal-to-interference-plus-noise ratio (SINR) or a distribution function of a frequency distribution model.

10. The method of claim 4, wherein the obtaining, the identifying, and the calculating are performed by the first mesh network device, and wherein the obtaining the first set of channel interference metrics comprises:
receiving, by a radio of the first mesh network device, a frame over a first communication channel between the radio and a radio of the second mesh network device, wherein the frame includes information that represents a transmit power level used by the radio of the second mesh network device to transmit the frame;
measuring a receive signal strength indicator (RSSI) value for the first communication channel; and
determining a first path loss value using the transmit power level and the RSSI value, wherein the first path loss value is one of the first set of channel interference metrics.

11. The method of claim 4, wherein the obtaining, the identifying, and the calculating are performed by the first mesh network device, and wherein the obtaining the first set of channel interference metrics comprises:
receiving, by a radio of the first mesh network device, a frame over a first communication channel between the radio and a radio of the second mesh network device;
measuring a receive signal strength indicator (RSSI) value for the first communication channel;
correlating the RSSI value with a transmit power level associated with a transmitter media access control (MAC) address of the radio of the second mesh network device; and
determining a first path loss value using the transmit power level and the RSSI value, wherein the first path loss value is one of the first set of channel interference metrics.

12. The method of claim 4, wherein the obtaining, the identifying, and the calculating are performed by a mesh network control service, and wherein the obtaining the first set of channel interference metrics comprises:

scheduling first data transmissions by the first mesh network device in a first time slot;
scheduling second data transmissions by the second mesh network device in a second time slot; and
scheduling third data transmissions by the third mesh network device in a third time slot.

13. A computer system, comprising:
a memory to store instructions of a power manager; and
a processor coupled to the memory, wherein the processor to:
obtain first data comprising a first interference threshold parameter, a first data rate threshold parameter, and a first set of channel interference metrics from a first mesh network device;
obtain second data comprising a second interference threshold parameter, a second data rate threshold parameter, and a second set of channel interference metrics from a second mesh network device;
obtain third data comprising a third interference threshold parameter, a third data rate threshold parameter, and a third set of channel interference metrics from a third mesh network device;
identify a network path that traverses the first mesh network device, the second mesh network device, and the third mesh network device;
calculate a first transmit power level for the first mesh network device, a second transmit power level for the second mesh network device, and a third transmit power level for the third mesh network device using the first data, the second data, and the third data; and
send information that represents the first transmit power level to the first mesh network device, information that represents the second transmit power level to the second mesh network device, and information that represents the third transmit power level to the third mesh network device, wherein data transmissions by each of the first mesh network device at the first transmit power level, the second mesh network device at the second transmit power level, and the third mesh network device at the third transmit power level ensure a minimum data rate over each hop in the network path.

14. The computer system of claim 13, wherein the processor is further to:
schedule first data transmissions by the first mesh network device in a first time slot;
schedule second data transmissions by the second mesh network device in a second time slot; and
schedule third data transmissions by the third mesh network device in a third time slot.

15. The computer system of claim 13, wherein the first data rate threshold parameter is a signal-to-interference-plus-noise ratio (SINR) value.

16. The computer system of claim 13, wherein the first data rate threshold parameter is a distribution function of a signal-to-interference-plus-noise ratio (SINR).

17. The computer system of claim 13, wherein the first data rate threshold parameter is a distribution function of a frequency distribution model.

18. The computer system of claim 13, wherein the first set of channel interference metrics comprises a first path loss value corresponding to a first communication channel between a radio of the first mesh network device and a radio of the second mesh network device, wherein the first set of channel interference metrics comprises a second path loss value corresponding to a second communication channel between a radio of the first mesh network device and a radio of the third mesh network device.

19. The computer system of claim 13, wherein the first set of channel interference metrics are path loss values, wherein the second set of channel interference metrics are path loss values, and wherein the third set of channel interference metrics are path loss values.

20. The computer system of claim 13, wherein the processor is further to:
 obtain a fourth interference threshold parameter, a fourth data rate threshold parameter, and a fourth set of channel interference metrics from a fourth mesh network device;
 identify a second network path that traverses the first mesh network device, the second mesh network device, the third mesh network device, and the fourth mesh network device;
 calculate the first transmit power level for the first mesh network device, the second transmit power level for the second mesh network device, the third transmit power level for the third mesh network device, and a fourth transmit power level for the fourth mesh network device; and
 send information that represents the first transmit power level to the first mesh network device, information that represents the second transmit power level to the second mesh network device, information that represents the third transmit power level to the third mesh network device, and information that represents the fourth transmit power level to the fourth mesh network device, wherein data transmissions by each of the first mesh network device at the first transmit power level, the second mesh network device at the second transmit power level, the third mesh network device at the third transmit power level, and the fourth mesh network device at the fourth transmit power level ensure a minimum data rate over each hop in the second network path.

* * * * *